US012672093B2

(12) United States Patent
Si

(10) Patent No.: US 12,672,093 B2
(45) Date of Patent: Jun. 30, 2026

(54) METHOD AND APPARATUS FOR POSITIONING IN RRC_IDLE OR RRC_INACTIVE STATE

(71) Applicant: Samsung Electronics Co., Ltd., Suwon-si (KR)

(72) Inventor: Hongbo Si, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 18/458,019

(22) Filed: Aug. 29, 2023

(65) Prior Publication Data

US 2024/0089895 A1     Mar. 14, 2024

Related U.S. Application Data

(60) Provisional application No. 63/439,966, filed on Jan. 19, 2023, provisional application No. 63/421,727, filed on Nov. 2, 2022, provisional application No. 63/407,454, filed on Sep. 16, 2022, provisional application No. 63/405,688, filed on Sep. 12, 2022, provisional application No. 63/405,256, filed on Sep. 9, 2022.

(51) Int. Cl.
| | |
|---|---|
| *H04W 64/00* | (2009.01) |
| *H04W 68/02* | (2009.01) |
| *H04W 72/232* | (2023.01) |

(52) U.S. Cl.
CPC ........... *H04W 64/00* (2013.01); *H04W 68/02* (2013.01); *H04W 72/232* (2023.01)

(58) Field of Classification Search
None
See application file for complete search history.

(56) References Cited

U.S. PATENT DOCUMENTS

| | | | |
|---|---|---|---|
| 2020/0236644 A1 | 7/2020 | Gunnarsson et al. | |
| 2023/0254809 A1* | 8/2023 | Wang ................... | H04W 64/006 |
| | | | 455/456.2 |
| 2023/0309050 A1 | 9/2023 | Cha et al. | |

FOREIGN PATENT DOCUMENTS

| | | |
|---|---|---|
| WO | 2022031889 A1 | 2/2022 |
| WO | 2022031974 A1 | 2/2022 |

(Continued)

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.

(Continued)

*Primary Examiner* — Suhail Khan

(57) ABSTRACT

Methods and apparatuses for positioning in RRC_IDLE or RRC_INACTIVE states. A method of a user equipment (UE) in a wireless communication system includes determining a first set of configurations for positioning and determining a second set of configurations for positioning. The first and second sets of configurations include configurations for a downlink (DL) positioning reference signal (PRS) based positioning measurement or an uplink (UL) sounding reference signal (SRS) transmission. The method further includes receiving a downlink control information (DCI) format including an indication on which of the first or second sets of configurations to use for positioning.

17 Claims, 16 Drawing Sheets

500

(56)  References Cited

FOREIGN PATENT DOCUMENTS

WO          2022080992  A1      4/2022
WO      WO-2024030177  A1  *    2/2024  ........... H04L 5/0091

OTHER PUBLICATIONS

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)", 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

International Search Report and Written Opinion issued Dec. 15, 2023 regarding International Application No. PCT/KR2023/013511, 9 pages.

Quectel, "Discussion on Low Power High Accuracy Positioning", 3GPP TSG RAN WG1 #109-e, R1-2204426, May 2022, 5 pages.

* cited by examiner

1100

A UE is provided with at least two sets of configurations for positioning — 1301

The UE is provided with a trigger — 1302

The UE can transit from an operation using the one set of configurations to an operation using the another set of configurations — 1303

1500

1501

A UE is provided with a set of configuration for PRS in RRC_IDLE, including a measurement window for PRS based measurement

1502

The UE is provided with a set of configuration for reporting PRS based measurement

1503

The UE performs the PRS based measurement based on the measurement window in RRC_IDLE

1504

The UE reports the PRS based measurement results

1

METHOD AND APPARATUS FOR POSITIONING IN RRC_IDLE OR RRC_INACTIVE STATE

CROSS-REFERENCE TO RELATED AND CLAIM OF PRIORITY

The present application claims priority under 35 U.S.C. § 119(e) to U.S. Provisional Patent Application No. 63/405,256 filed on Sep. 9, 2022; U.S. Provisional Patent Application No. 63/405,688 filed on Sep. 12, 2022; U.S. Provisional Patent Application No. 63/407,454 filed on Sep. 16, 2022; U.S. Provisional Patent Application No. 63/421,727 filed on Nov. 2, 2022; and U.S. Provisional Patent Application No. 63/439,966 filed on Jan. 19, 2023, which are hereby incorporated by reference in their entirety.

TECHNICAL FIELD

The present disclosure relates generally to wireless communication systems and, more specifically, the present disclosure relates to methods and apparatuses for positioning in RRC_IDLE or RRC_INACTIVE states.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance. To meet the demand for wireless data traffic having increased since deployment of 4G communication systems, and to enable various vertical applications, 5G communication systems have been developed and are currently being deployed.

SUMMARY

The present disclosure relates to positioning in RRC_IDLE or RRC_INACTIVE states.

In one embodiment, a base station (BS) in a wireless communication system is provided. The BS includes a processor configured to determine a first set of configurations for positioning and determine a second set of configurations for positioning. The first and second sets of configurations include configurations for a downlink (DL) positioning reference signal (PRS) based positioning measurement or an uplink (UL) sounding reference signal (SRS) transmission. The BS further includes a transceiver operably coupled to the processor. The transceiver is configured to transmit a downlink control information (DCI) format including an indication on which of the first or second sets of configurations to use for positioning.

In another embodiment, a user equipment (UE) in a wireless communication system is provided. The UE includes a processor configured to determine a first set of configurations for positioning and determine a second set of configurations for positioning. The first and second sets of configurations include configurations for a DL PRS based positioning measurement or an UL SRS transmission. The UE further includes a transceiver operably coupled to the processor. The transceiver is configured to receive a DCI format including an indication on which of the first or second sets of configurations to use for positioning.

In yet another embodiment, a method of a UE in a wireless communication system is provided. The method includes determining a first set of configurations for positioning and determining a second set of configurations for positioning. The first and second sets of configurations include configurations for a DL PRS based positioning measurement or an UL SRS transmission. The method further includes receiving a DCI format including an indication on which of the first or second sets of configurations to use for positioning.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-16, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to the deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v16.1.0, "NR; Physical channels and modulation;" [2] 3GPP TS 38.212 v16.1.0, "NR; Multiplexing and Channel coding;" [3] 3GPP TS 38.213 v16.1.0, "NR; Physical Layer Procedures for Control;" [4] 3GPP TS 38.214 v16.1.0, "NR; Physical Layer Procedures for Data;" and [5] 3GPP TS 38.331 v16.1.0, "NR; Radio Resource Control (RRC) Protocol Specification."

Figure 1:
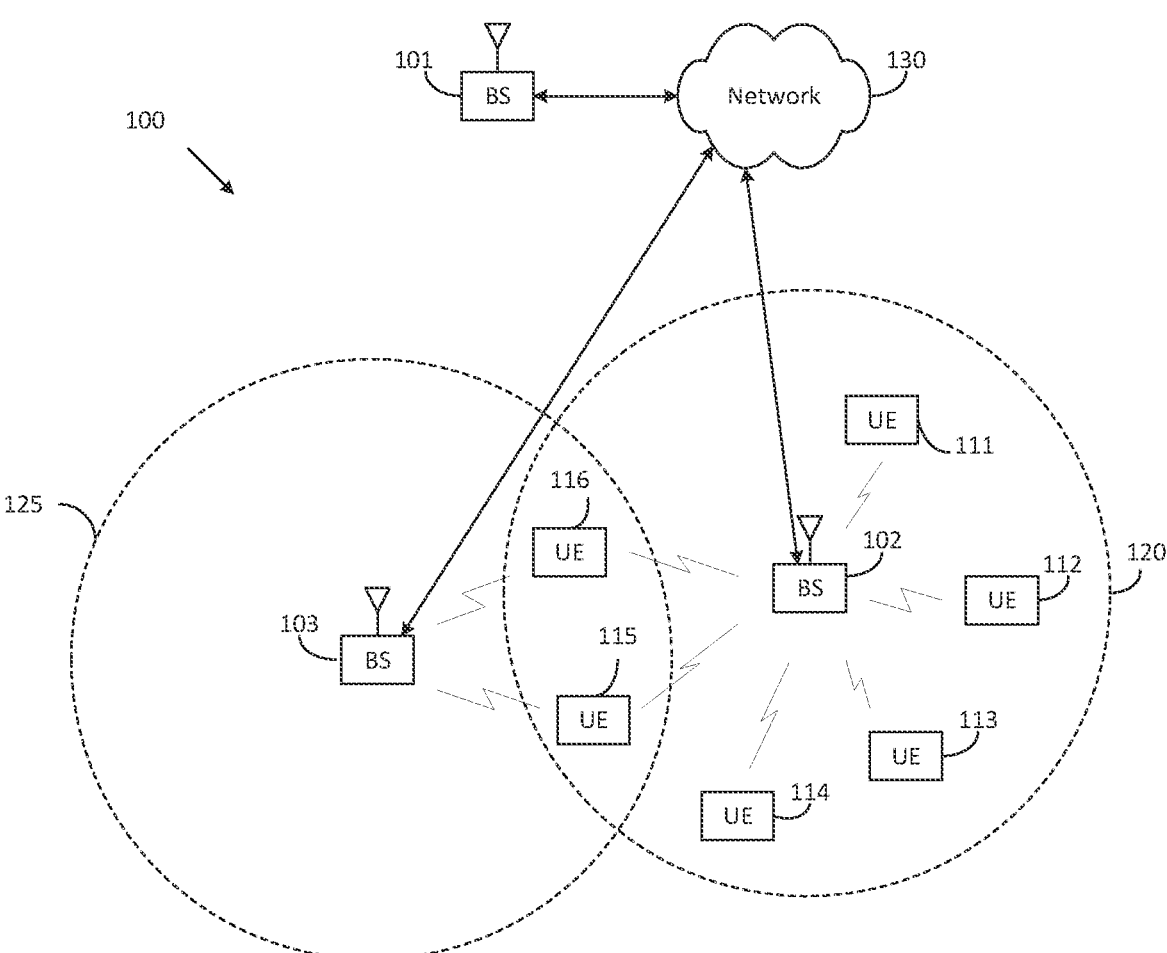
FIG. 1 illustrates an example wireless network according to embodiments of the present disclosure.
Figure 2:
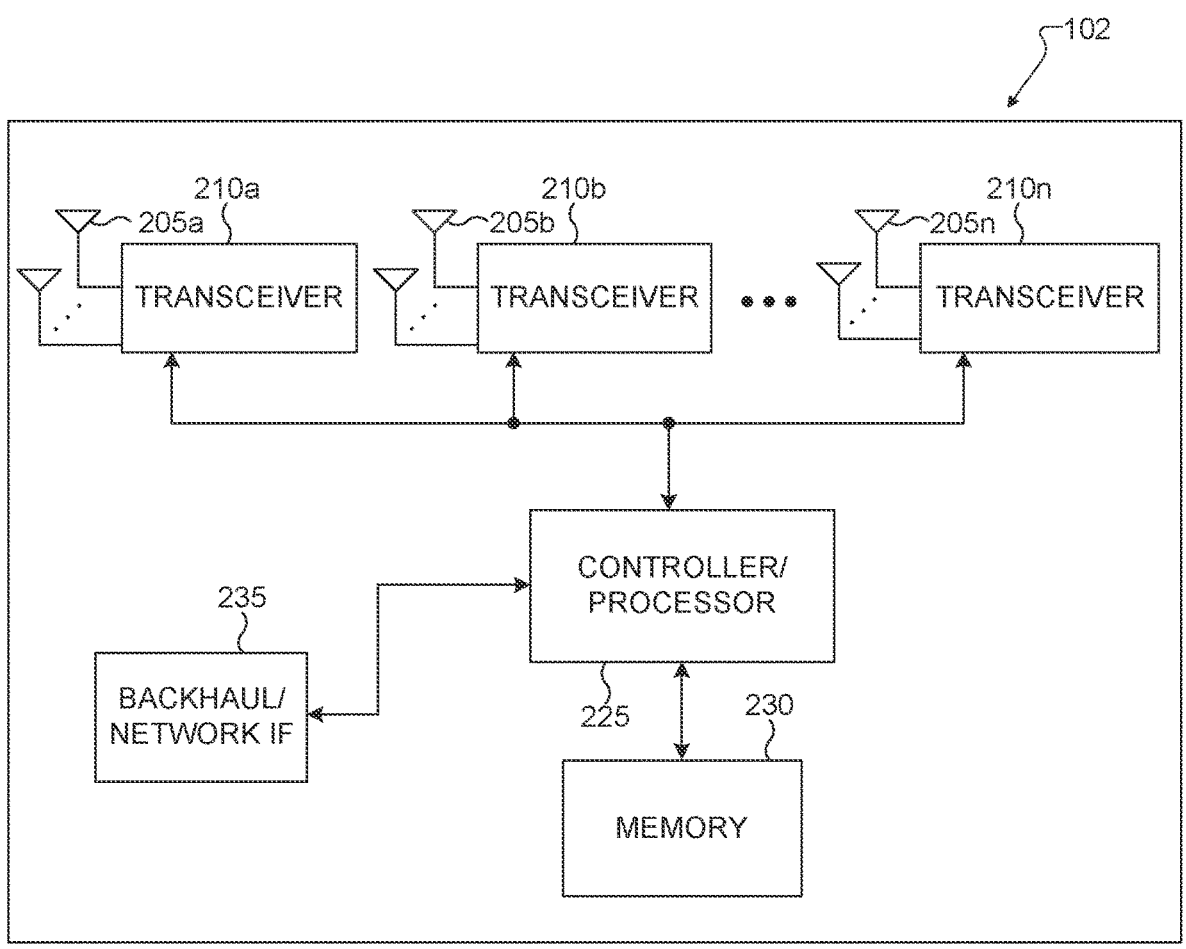
FIG. 2 illustrates an example gNodeB (gNB) according to embodiments of the present disclosure.
Figure 3:
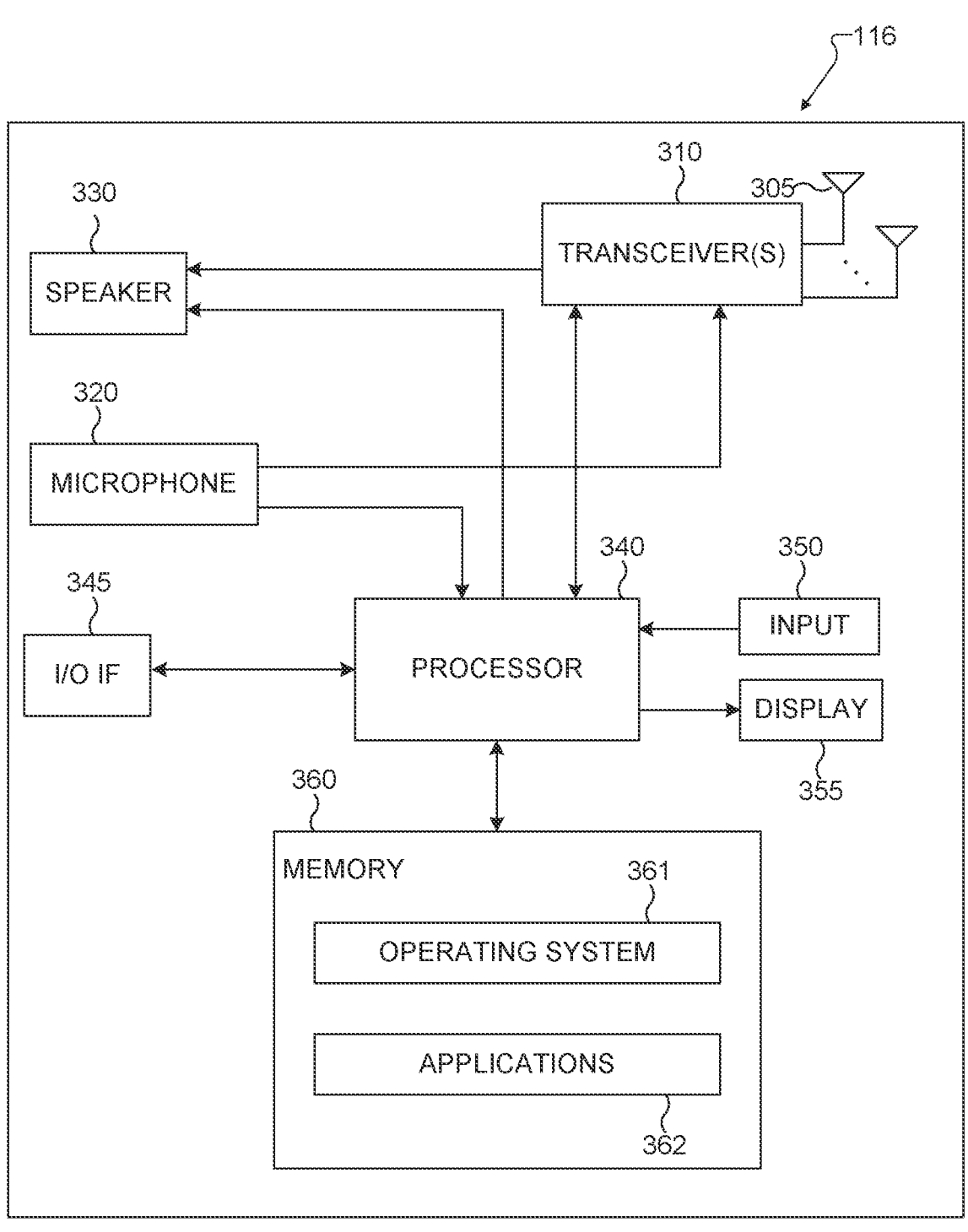
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs)

within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3 rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for utilizing positioning in RRC_IDLE or RRC_INACTIVE states. In certain embodiments, one or more of the BSs 101-103 include circuitry, programing, or a combination thereof to support positioning in RRC_IDLE or RRC_INACTIVE states.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the wireless network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting positioning in RRC_IDLE or RRC_INACTIVE states. Any of a wide variety of other functions could be supported in the gNB 102 by the controller/processor 225.

The controller/processor 225 is also capable of executing programs and other processes resident in the memory 230, such as processes to support positioning in RRC_IDLE or RRC_INACTIVE states as described in various embodiments of the present disclosure. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for positioning in RRC_IDLE or RRC_INACTIVE states as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
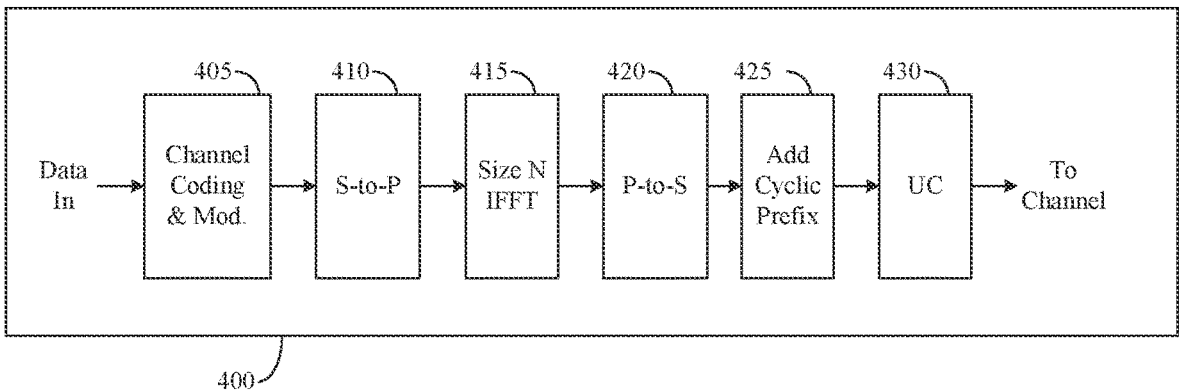
FIGS. 4A and 4B illustrate an example of a wireless transmit and receive paths according to embodiments of the present disclosure.
Figure 4B:
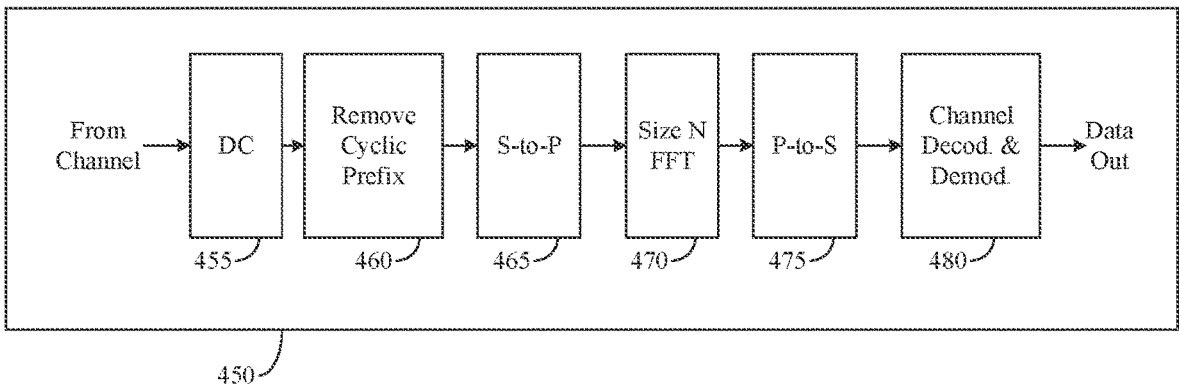

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the receive path 450 is configured to support positioning in RRC_IDLE or RRC_INACTIVE states as described in embodiments of the present disclosure.

As illustrated in FIG. 4A, the transmit path 400 includes a channel coding and modulation block 205, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Embodiments of the present disclosure recognize that new radio (NR) supports PRS based downlink positioning measurement and SRS based uplink positioning measurement.

For downlink positioning, a UE can be configured with one or multiple DL PRS resource set configurations, wherein each resource set includes one or multiple DL PRS resources and each of them is associated with a spatial transmission filter. For uplink positioning, the UE can be configured with one or multiple SRS resource sets, wherein each resource set includes one or multiple SRS resource.

NR also supports paging procedure for RRC_IDLE and RRC_INACTIVE modes, such that the UE can periodically wake up to monitor system information update and operate with low power consumption. Paging message can be carried by a PDSCH (e.g., paging PDSCH) associated with a physical downlink control channel (PDCCH) (e.g., paging PDCCH), or carried by the PDCCH directly when the amount of information is low (e.g., short message). The gaping PDCCH carries the DCI format 1_0 with cyclic redundancy check (CRC) scrambled by paging radio network temporary identifier (P-RNTI).

To improve power efficiency at least in RRC_IDLE and/or RRC_INACTIVE modes, the UE can associate the DL and/or UL positioning procedures with paging procedure. The UE can skip some of the DL positioning measurement, and/or UL SRS transmission, and/or DL positioning measurement reporting, based on paging.

Embodiments of the present disclosure focus on the design of positioning triggered by a paging procedure in order to save power at the UE side. More precisely, the following approaches are included in the embodiments of the present disclosure, wherein for each approach, both explicit indication and implicit indication are contemplated:

Paging DCI based positioning.

Short message based positioning.

Paging PDSCH based positioning.

Figure 5:
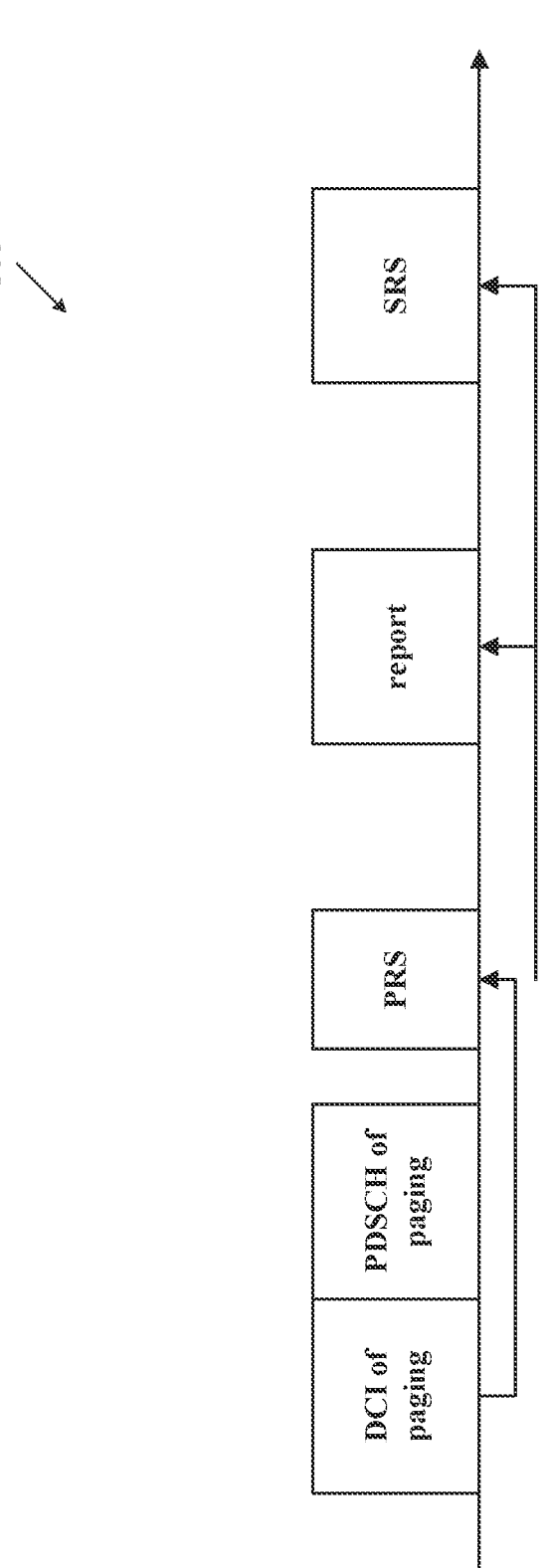
FIG. 5 illustrates an example of paging downlink control information (DCI) based positioning according to embodiments of the present disclosure.

FIG. 5 illustrates an example timeline 500 for a paging DCI based positioning according to embodiments of the present disclosure. For example, the timeline 500 for a paging DCI based positioning can be utilized by the gNB 102 and the UE 116. This example is for illustration only and other embodiments can be used without departing from the scope of the disclosure.

In one embodiment, a UE can determine whether or not to perform DL positioning measurement, and/or UL SRS transmission, and/or DL positioning measurement reporting, based on the DCI format for paging (e.g., DCI format 1_0 with CRC scrambled by P-RNTI).

In one example, the UE 116 can determine whether or not to perform DL positioning measurement, and/or UL SRS transmission, and/or DL positioning measurement reporting, based on an explicit indication in the DCI format for paging (e.g., DCI format 1_0 with CRC scrambled by P-RNTI).

Figure 6:
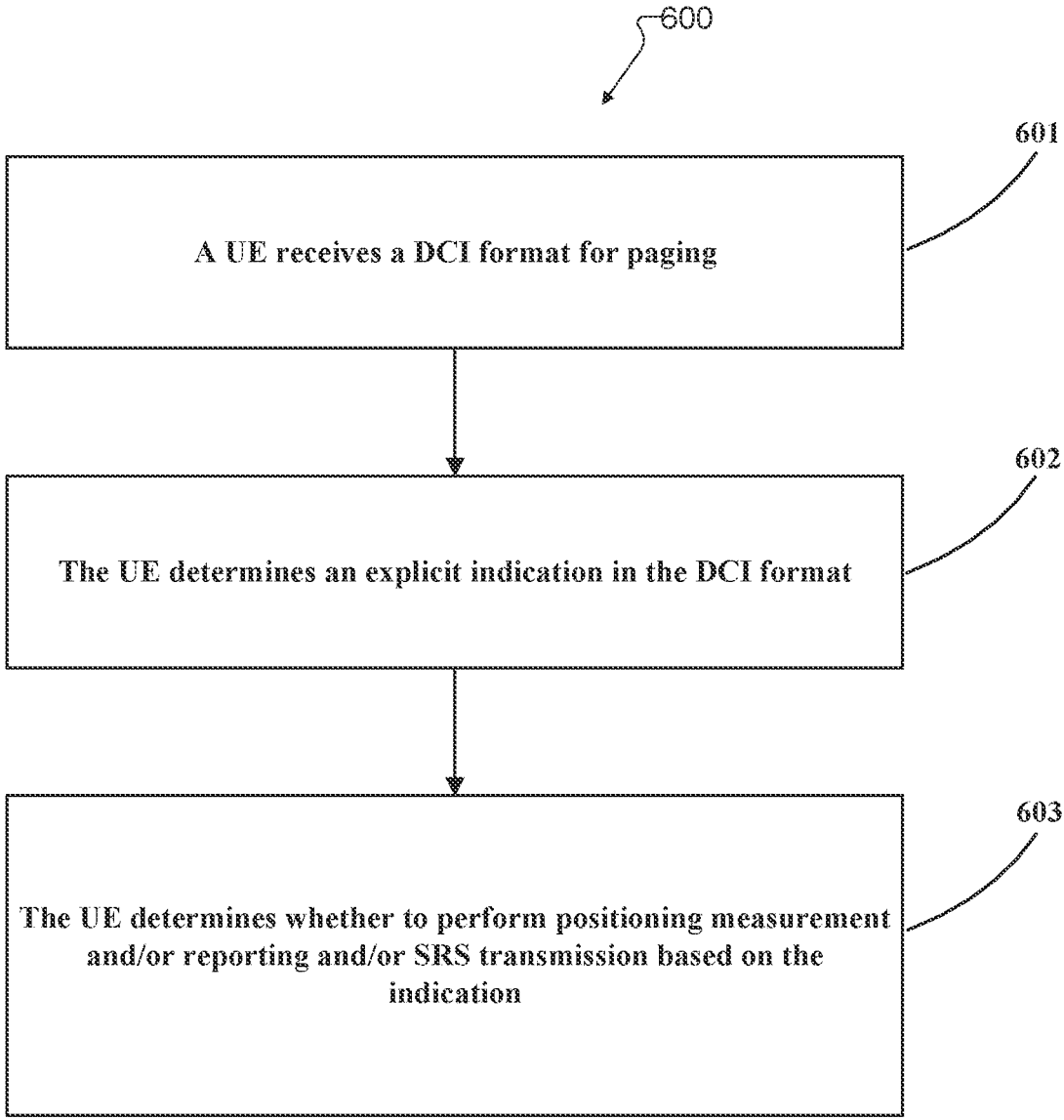
FIG. 6 illustrates a flowchart of an example UE procedure for paging DCI based positioning according to embodiments of the present disclosure.

FIG. 6 illustrates a flowchart of an example UE procedure 600 for paging DCI based positioning according to embodiments of the present disclosure. For example, procedure 600 can be utilized by any of the UEs 111-116 of FIG. 1 for paging triggered positioning. This example is for illustration only and other embodiments can be used without departing from the scope of the disclosure.

The procedure begins in step 601, UE 116 can first receive the DCI format for paging. In step 602, UE 116 then determines an explicit indication of whether or not to perform DL positioning measurement, and/or SRS transmission, and/or DL positioning measurement reporting, based on an explicit indication in the DCI format for paging. In step 603, UE 116 then performs DL positioning measurement, and/or SRS transmission, and/or DL positioning measurement reporting, if indicated by the DCI format for paging.

In one sub-example, the explicit indication includes whether UE 116 performs DL PRS measurement in a particular PRS measurement occasion.

In one instance, the PRS measurement occasion is the next one after receiving the DCI format for paging.

In another instance, the PRS measurement occasion is the next one after receiving the DCI format for paging with a delay, wherein the delay can be either fixed or configured.

In yet another instance, the DCI format can indicate the PRS measurement occasion, e.g., using a time-domain offset from receiving the DCI format.

In yet another instance, the PRS in the PRS measurement occasion can be quasi co-located (QCLed) with the DMRS of the PDCCH carrying the DCI format.

In another sub-example, the explicit indication includes whether UE 116 performs DL PRS measurement in the associated paging cycle (e.g., the paging cycle where the DCI format for paging is located).

In yet another sub-example, the explicit indication includes whether UE 116 performs DL PRS measurement in the associated discontinuous reception (DRX) cycle and/or extended discontinuous reception (eDRX) cycle (e.g., the DRX cycle and/or eDRX cycle where the DCI format for paging is located). In yet another sub-example, the explicit indication includes whether UE 116 performs DL PRS measurement in an associated time-domain window.

In one instance, the time-domain window can be configured by system information block (SIB) (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In yet another instance, the time-domain window can be indicated in the DCI format.

In one sub-example, the explicit indication includes whether UE 116 reports DL PRS measurement in a particular PRS measurement reporting occasion.

In one instance, the PRS measurement reporting occasion is the next associated one after receiving DCI format for paging.

In another instance, the PRS measurement reporting occasion is the next associated one after receiving DCI format for paging with a delay, wherein the delay can be either fixed or configured.

In yet another instance, the PRS measurement reporting occasion can be indicated by the DCI format, e.g., using a time-domain offset from receiving the DCI format.

In yet another instance, the reference signal (RS) in the PRS measurement reporting occasion can be QCLed with the DMRS of the PDCCH carrying the DCI format.

In another sub-example, the explicit indication includes whether UE 116 reports DL PRS measurement in the associated paging cycle (e.g., the paging cycle where the DCI format for paging is located).

In yet another sub-example, the explicit indication includes whether UE 116 reports DL PRS measurement in the associated DRX cycle and/or eDRX cycle (e.g., the DRX cycle and/or eDRX cycle where the DCI format for paging is located).

In yet another sub-example, the explicit indication includes whether UE 116 reports DL PRS measurement in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In yet another instance, the time-domain window can be indicated in the DCI format.

In one sub-example, the explicit indication includes whether UE 116 transmits SRS in a particular SRS transmission occasion.

In one instance, the SRS transmission occasion is the next one after receiving the DCI format for paging.

In another instance, the SRS transmission occasion is the next one after receiving the DCI format for paging with a delay, wherein the delay can be either fixed or configured.

In yet another instance, the SRS transmission occasion can be indicated by the DCI format, e.g., using a time-domain offset.

In yet another instance, the SRS in the SRS transmission occasion can be QCLed with the DMRS of the PDCCH carrying the DCI format.

In another sub-example, the explicit indication includes whether UE 116 transmits SRS in the associated paging cycle (e.g., the paging cycle where the DCI format for paging is located).

In yet another sub-example, the explicit indication includes whether UE 116 transmits SRS in the associated DRX cycle and/or eDRX cycle (e.g., the DRX cycle and/or eDRX cycle where the DCI format for paging is located).

In yet another sub-example, the explicit indication includes whether UE 116 transmits SRS in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In yet another instance, the time-domain window can be indicated in the DCI format.

In one sub-example, the explicit indication for whether or not to perform DL positioning measurement, and/or SRS transmission, and/or DL positioning measurement reporting can be a common indication. The UE 116 determines whether or not to perform DL positioning measurement, and/or SRS transmission, and/or DL positioning measurement reporting jointly based on the indication.

In another sub-example, the explicit indication for whether or not to perform DL positioning measurement, and/or SRS transmission, and/or DL positioning measurement reporting can be a separate indication in the DCI format, e.g., one bit for each purpose, correspondingly.

In yet another sub-example, part of the explicit indication for whether or not to perform DL positioning measurement, and/or SRS transmission, and/or DL positioning measurement reporting can be a common indication, and the remaining can use a separate indication, in the DCI format. For one instance, whether or not to perform DL positioning measurement and DL positioning measurement reporting can use a joint indication. For another instance, whether or not to perform SRS transmission and DL positioning measurement reporting can use a joint indication.

In another example, UE 116 can determine to perform DL positioning measurement, and/or SRS transmission, and/or DL positioning measurement reporting, based on an implicit indication, wherein the implicit indication can be the reception of the DCI format for paging (e.g., DCI format 1_0 with CRC scrambled by P-RNTI); otherwise (e.g., if UE 116 doesn't receive the DCI format for paging), UE 116 can skip performing DL positioning measurement, and/or SRS transmission, and/or DL positioning measurement reporting.

In one sub-example, if the UE 116 does not receive the DCI format for paging, the UE 116 can skip performing DL PRS measurement in a particular PRS measurement occasion; and/or if the UE 116 receives the DCI format for paging, the UE 116 can perform DL PRS measurement in a particular PRS measurement occasion.

In one instance, the PRS measurement occasion is the next one after the occasion to receive the DCI format for paging.

In another instance, the PRS measurement occasion is the next one after the occasion to receive the DCI format for paging with a delay, wherein the delay can be either fixed or configured.

In yet another instance, the PRS in the PRS measurement occasion can be QCLed with the DMRS of the PDCCH carrying the DCI format.

In another sub-example, if the UE 116 doesn't receive the DCI format for paging, the UE 116 can skip performing DL PRS measurement in the associated paging cycle (e.g., the paging cycle where the DCI format for paging is located); and/or if the UE 116 receives the DCI format for paging, the UE 116 can perform DL PRS measurement in the associated paging cycle.

In yet another sub-example, if the UE 116 doesn't receive the DCI format for paging, the UE 116 can skip performing DL PRS measurement in the associated DRX cycle and/or eDRX cycle (e.g., the DRX cycle and/or eDRX cycle where the DCI format for paging is located); and/or if the UE 116 receives the DCI format for paging, the UE 116 can perform DL PRS measurement in the associated DRX cycle and/or eDRX cycle.

In yet another sub-example, if the UE 116 does not receive the DCI format for paging, the UE 116 can skip performing DL PRS measurement in an associated time-domain window; and/or if the UE 116 receives the DCI format for paging, the UE 116 can perform DL PRS measurement in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In one sub-example, if the UE 116 does not receive the DCI format for paging, the UE 116 can skip reporting DL PRS measurement in a particular PRS measurement reporting occasion; and/or if the UE 116 receives the DCI format for paging, the UE 116 can report DL PRS measurement in a particular PRS measurement reporting occasion.

In one instance, the PRS measurement reporting occasion is the next one after the occasion to receive the DCI format for paging.

In another instance, the PRS measurement reporting occasion is the next one after the occasion to receive the DCI format for paging with a delay, wherein the delay can be either fixed or configured.

In yet another instance, the PRS in the PRS measurement reporting occasion can be QCLed with the DMRS of the PDCCH carrying the DCI format.

In another sub-example, if the UE 116 doesn't receive the DCI format for paging, the UE 116 can skip reporting DL PRS measurement in the associated paging cycle (e.g., the paging cycle where the DCI format for paging is located); and/or if the UE 116 receives the DCI format for paging, the UE 116 can report DL PRS measurement in the associated paging cycle.

In yet another sub-example, if the UE 116 doesn't receive the DCI format for paging, the UE 116 can skip reporting DL PRS measurement in the associated DRX cycle and/or eDRX cycle (e.g., the DRX cycle and/or eDRX cycle where the DCI format for paging is located); and/or if the UE 116 receives the DCI format for paging, the UE 116 can report DL PRS measurement in the associated DRX cycle and/or eDRX cycle.

In yet another sub-example, if the UE 116 does not receive the DCI format for paging, the UE 116 can skip reporting DL PRS measurement in an associated time-domain window; and/or if the UE 116 receives the DCI format for paging, the UE 116 can report DL PRS measurement in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In one sub-example, if the UE 116 does not receive the DCI format for paging, the UE 116 can skip SRS transmission in a particular SRS transmission occasion; and/or if the UE 116 receives the DCI format for paging, the UE 116 can perform SRS transmission in a particular SRS transmission occasion.

In one instance, the SRS transmission occasion is the next one after the occasion to receive the DCI format for paging.

In another instance, the SRS transmission occasion is the next one after the occasion to receive the DCI format for paging with a delay, wherein the delay can be either fixed or configured.

In yet another instance, the SRS in the SRS transmission occasion can be QCLed with the DMRS of the PDCCH carrying the DCI format.

In another sub-example, if the UE 116 doesn't receive the DCI format for paging, the UE 116 can skip SRS transmission in the associated paging cycle (e.g., the paging cycle where the DCI format for paging is located); and/or if the UE 116 receives the DCI format for paging, the UE 116 can perform SRS transmission in the associated paging cycle.

In yet another sub-example, if the UE 116 doesn't receive the DCI format for paging, the UE 116 can skip SRS transmission in the associated DRX cycle and/or eDRX cycle (e.g., the DRX cycle and/or eDRX cycle where the DCI format for paging is located); and/or if the UE 116 receives the DCI format for paging, the UE 116 can perform SRS transmission in the associated DRX cycle and/or eDRX cycle.

In yet another sub-example, if the UE 116 does not receive the DCI format for paging, the UE 116 can skip SRS transmission in an associated time-domain window; and/or if the UE 116 receives the DCI format for paging, the UE 116 can perform SRS transmission in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

Figure 7:
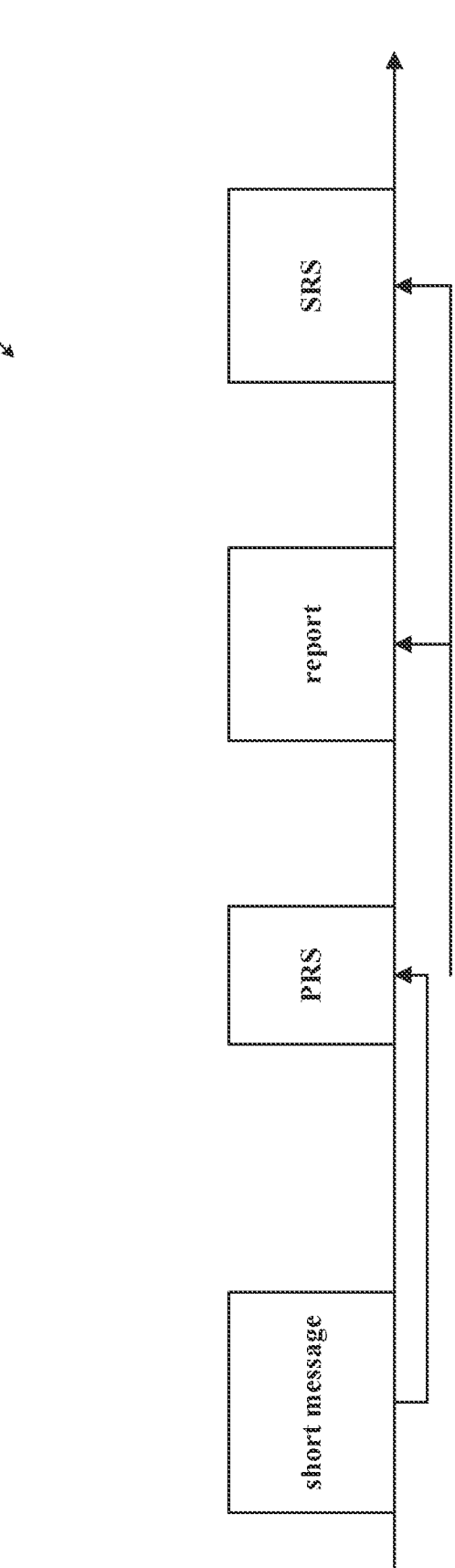
FIG. 7 illustrates an example of short message based positioning according to embodiments of the present disclosure.

FIG. 7 illustrates an example timeline 700 for of a short message based positioning according to embodiments of the present disclosure. For example, timeline 700 for of a short message based positioning can be utilized by the gNB 102 and the UE 116. This example is for illustration only and other embodiments can be used without departing from the scope of the disclosure.

In one embodiment, a UE can determine whether or not to perform DL positioning measurement, and/or UL SRS transmission, and/or DL positioning measurement reporting, based on the short message (e.g., field in DCI format 1_0 with CRC scrambled by P-RNTI and carried by a PDCCH).

In one example, the UE 116 can determine whether or not to perform DL positioning measurement, and/or UL SRS transmission, and/or DL positioning measurement reporting, based on an explicit indication in the short message.

Figure 8:
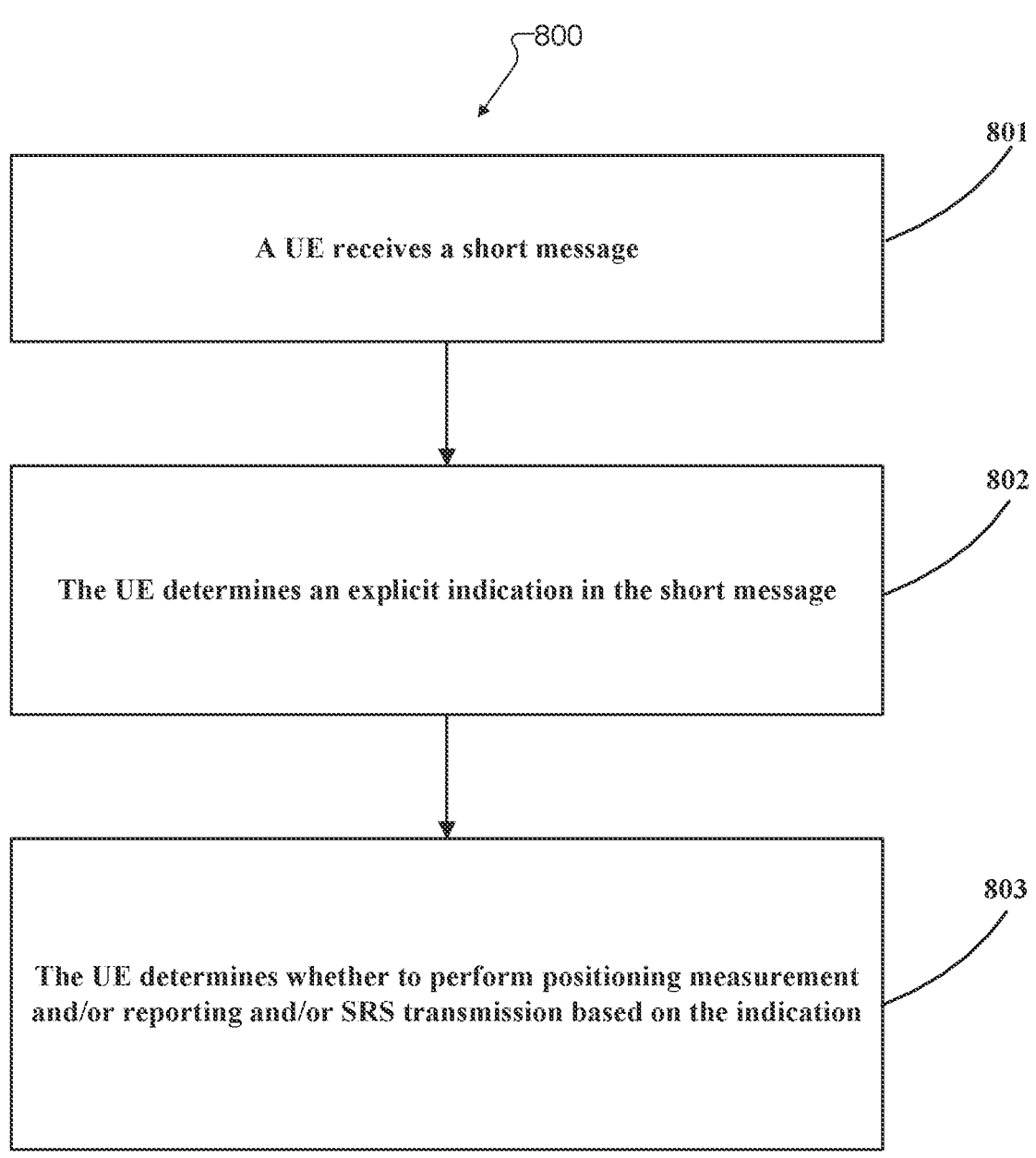
FIG. 8 illustrates a flowchart of an example UE procedure for paging DCI based positioning according to embodiments of the present disclosure.

FIG. 8 illustrates a flowchart of an example UE procedure 800 for paging DCI based positioning according to embodiments of the present disclosure. For example, procedure 800 can be utilized by any of the UEs 111-116 of FIG. 1 for paging DCI based positioning. This example is for illustration only and other embodiments can be used without departing from the scope of the disclosure.

The procedure begins with step 801, the UE 116 can first receive the short message. In step 802, the UE 116 then determines an explicit indication of whether or not to perform DL positioning measurement, and/or SRS transmission, and/or DL positioning measurement reporting, based on an explicit indication in the short message. In step 803, the UE 116 then performs DL positioning measurement, and/or SRS transmission, and/or DL positioning measurement reporting, if indicated by the short message.

In one sub-example, the explicit indication includes whether the UE 116 performs DL PRS measurement in a particular PRS measurement occasion.

In one instance, the PRS measurement occasion is the next one after receiving the short message.

In another instance, the PRS measurement occasion is the next one after receiving the short message with a delay, wherein the delay can be either fixed or configured.

In yet another instance, the PRS measurement occasion can be indicated by the short message, e.g., using a time-domain offset from receiving the short message.

In yet another instance, the PRS in the PRS measurement occasion can be QCLed with the DMRS of the PDCCH carrying the short message.

In another sub-example, the explicit indication includes whether the UE 116 performs DL PRS measurement in the associated paging cycle (e.g., the paging cycle where the short message is located).

In yet another sub-example, the explicit indication includes whether the UE 116 performs DL PRS measurement in the associated DRX cycle and/or eDRX cycle (e.g., the DRX cycle and/or eDRX cycle where the short message is located).

In yet another sub-example, the explicit indication includes whether the UE 116 performs DL PRS measurement in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In yet another instance, the time-domain window can be indicated in the short message.

In one sub-example, the explicit indication includes whether the UE 116 reports DL PRS measurement in a particular PRS measurement reporting occasion.

In one instance, the PRS measurement reporting occasion is the next associated one after receiving short message.

In another instance, the PRS measurement reporting occasion is the next associated one after receiving short message with a delay, wherein the delay can be either fixed or configured.

In yet another instance, the PRS measurement reporting occasion can be indicated by the short message, e.g., using a time-domain offset from receiving the short message.

In yet another instance, the RS in the PRS measurement reporting occasion can be QCLed with the DMRS of the PDCCH carrying the short message.

In another sub-example, the explicit indication includes whether the UE 116 reports DL PRS measurement in the associated paging cycle (e.g., the paging cycle where the short message is located).

In yet another sub-example, the explicit indication includes whether the UE 116 reports DL PRS measurement in the associated DRX cycle and/or eDRX cycle (e.g., the DRX cycle and/or eDRX cycle where the short message is located).

In yet another sub-example, the explicit indication includes whether the UE 116 reports DL PRS measurement in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In yet another instance, the time-domain window can be indicated in the short message.

In one sub-example, the explicit indication includes whether the UE 116 transmits SRS in a particular SRS transmission occasion.

In one instance, the SRS transmission occasion is the next one after receiving the short message.

In another instance, the SRS transmission occasion is the next one after receiving the short message with a delay, wherein the delay can be either fixed or configured.

In yet another instance, the SRS transmission occasion can be indicated by the short message, e.g., using a time-domain offset.

In yet another instance, the SRS in the SRS transmission occasion can be QCLed with the DMRS of the PDCCH carrying the short message.

In another sub-example, the explicit indication includes whether the UE 116 transmits SRS in the associated paging cycle (e.g., the paging cycle where the short message is located).

In yet another sub-example, the explicit indication includes whether the UE 116 transmits SRS in the associated DRX cycle and/or eDRX cycle (e.g., the DRX cycle and/or eDRX cycle where the short message is located).

In yet another sub-example, the explicit indication includes whether the UE 116 transmits SRS in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In yet another instance, the time-domain window can be indicated in the short message.

In one sub-example, the explicit indication for whether or not to perform DL positioning measurement, and/or SRS transmission, and/or DL positioning measurement reporting can be a common indication. The UE 116 determines whether or not to perform DL positioning measurement, and/or SRS transmission, and/or DL positioning measurement reporting jointly based on the indication.

In another sub-example, the explicit indication for whether or not to perform DL positioning measurement, and/or SRS transmission, and/or DL positioning measurement reporting can be a separate indication in the short message, e.g., one bit for each purpose, correspondingly.

In yet another sub-example, part of the explicit indication for whether or not to perform DL positioning measurement, and/or SRS transmission, and/or DL positioning measurement reporting can be a common indication, and the remaining can use a separate indication, in the short message. For one instance, whether or not to perform DL positioning measurement and DL positioning measurement reporting can use a joint indication. For another instance, whether or not to perform SRS transmission and DL positioning measurement reporting can use a joint indication.

In another example, the UE 116 can determine to perform DL positioning measurement, and/or SRS transmission, and/or DL positioning measurement reporting, based on an implicit indication, wherein the implicit indication can be the reception of the short message (e.g., carried by a PDCCH); otherwise (e.g., if the UE 116 doesn't receive short message), the UE 116 can skip performing DL positioning measurement, and/or SRS transmission, and/or DL positioning measurement reporting.

In one sub-example, if the UE 116 does not receive the short message, the UE 116 can skip performing DL PRS measurement in a particular PRS measurement occasion; and/or if the UE 116 receives the short message, the UE 116 performs DL PRS measurement in a particular PRS measurement occasion.

In one instance, the PRS measurement occasion is the next one after the occasion to receive the short message.

In another instance, the PRS measurement occasion is the next one after the occasion to receive the short message with a delay, wherein the delay can be either fixed or configured.

In yet another instance, the PRS in the PRS measurement occasion can be QCLed with the DMRS of the PDCCH carrying the short message.

In another sub-example, if the UE 116 doesn't receive the short message, the UE 116 can skip performing DL PRS measurement in the associated paging cycle (e.g., the paging cycle where the short message is located); and/or if the UE 116 receives the short message, the UE 116 performs at least one DL PRS measurement in the associated paging cycle.

In yet another sub-example, if the UE 116 doesn't receive the short message, the UE 116 can skip performing DL PRS measurement in the associated DRX cycle and/or eDRX cycle (e.g., the DRX cycle and/or eDRX cycle where the short message is located); and/or if the UE 116 receives the short message, the UE 116 performs at least one DL PRS measurement in the associated DRX cycle and/or eDRX cycle.

In yet another sub-example, if the UE 116 does not receive the short message, the UE 116 can skip performing DL PRS measurement in an associated time-domain window; and/or if the UE 116 receives the short message, the UE 116 performs at least one DL PRS measurement in the associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In one sub-example, if the UE 116 does not receive the short message, the UE 116 can skip reporting DL PRS measurement in a particular PRS measurement reporting occasion; and/or if the UE 116 receives the short message, the UE 116 can report DL PRS measurement in a particular PRS measurement reporting occasion.

In one instance, the PRS measurement reporting occasion is the next one after the occasion to receive the short message.

In another instance, the PRS measurement reporting occasion is the next one after the occasion to receive the short message with a delay, wherein the delay can be either fixed or configured.

In yet another instance, the PRS in the PRS measurement reporting occasion can be QCLed with the DMRS of the PDCCH carrying the short message.

In another sub-example, if the UE 116 doesn't receive the short message, the UE 116 can skip reporting DL PRS measurement in the associated paging cycle (e.g., the paging cycle where the short message is located); and/or if the UE 116 receives the short message, the UE 116 can report DL PRS measurement in the associated paging cycle.

In yet another sub-example, if the UE 116 doesn't receive the short message, the UE 116 can skip reporting DL PRS measurement in the associated DRX cycle and/or eDRX cycle (e.g., the DRX cycle and/or eDRX cycle where the short message is located); and/or if the UE 116 receives the short message, the UE 116 can report DL PRS measurement in the associated DRX cycle and/or eDRX cycle.

In yet another sub-example, if the UE 116 does not receive the short message, the UE 116 can skip reporting DL PRS measurement in an associated time-domain window; and/or if the UE 116 receives the short message, the UE 116 can report DL PRS measurement in an associated time-domain window.

In one instance, the time-domain window can be config-
ured by SIB (e.g., SIB1).

In another instance, the time-domain window can be fixed
in the specification (e.g., one slot or a fixed number of
slots).

In yet another instance, the time-domain window can be
configured by dedicated RRC (e.g., maintaining the
configuration when RRC releases).

In one sub-example, if the UE 116 does not receive the
short message, the UE 116 can skip SRS transmission in a
particular SRS transmission occasion; and/or if the UE 116
receives the short message, the UE 116 can perform SRS
transmission in a particular SRS transmission occasion.

In one instance, the SRS transmission occasion is the next
one after the occasion to receive the short message.

In another instance, the SRS transmission occasion is the
next one after the occasion to receive the short message
with a delay, wherein the delay can be either fixed or
configured.

In yet another instance, the SRS in the SRS transmission
occasion can be QCLed with the DMRS of the PDCCH
carrying the short message.

In another sub-example, if the UE 116 does not receive
the short message, the UE 116 can skip SRS transmission in
the associated paging cycle (e.g., the paging cycle where the
short message is located); and/or if the UE 116 receives the
short message, the UE 116 can perform SRS transmission in
the associated paging cycle.

In yet another sub-example, if the UE 116 doesn't receive
the short message, the UE 116 can skip SRS transmission in
the associated DRX cycle and/or eDRX cycle (e.g., the DRX
cycle and/or eDRX cycle where the short message is
located); and/or if the UE 116 receives the short message,
the UE 116 can perform SRS transmission in the associated
DRX cycle and/or eDRX cycle.

In yet another sub-example, if the UE 116 does not
receive the short message, the UE 116 can skip SRS trans-
mission in an associated time-domain window; and/or if the
UE 116 receives the short message, the UE 116 can perform
SRS transmission in the associated time-domain window.

In one instance, the time-domain window can be config-
ured by SIB (e.g., SIB1).

In another instance, the time-domain window can be fixed
in the specification (e.g., one slot or a fixed number of
slots).

In yet another instance, the time-domain window can be
configured by dedicated RRC (e.g., maintaining the
configuration when RRC releases).

Figure 9:
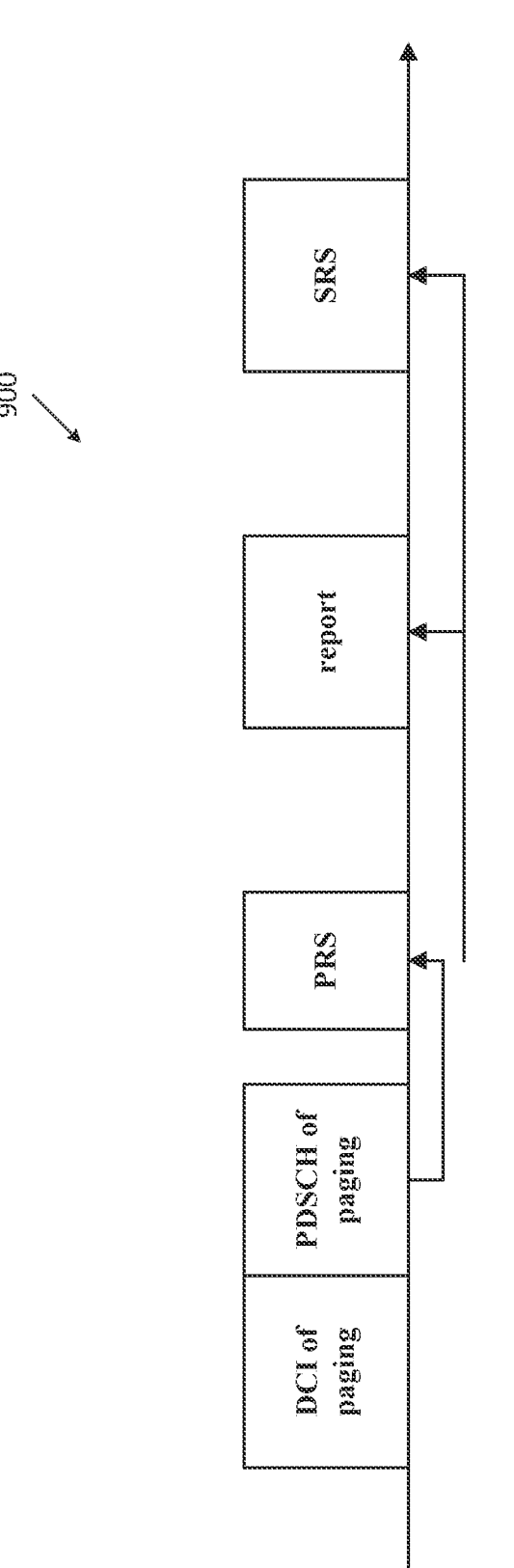
FIG. 9 illustrates an example of paging physical downlink shared channel (PDSCH) based positioning according to embodiments of the present disclosure.

FIG. 9 illustrates an example of timeline 700 for paging
physical downlink shared channel (PDSCH) based position-
ing according to embodiments of the present disclosure. For
example, the timeline 700 for paging PDSCH based posi-
tioning can be utilized by the gNB and the UE 116. This
example is for illustration only and other embodiments can
be used without departing from the scope of the disclosure.

In one embodiment, a UE can determine whether or not
to perform DL positioning measurement, and/or UL SRS
transmission, and/or DL positioning measurement reporting,
based on the PDSCH of paging (e.g., the PDSCH associated
with the PDCCH carrying the DCI format 1_0 with CRC
scrambled by P-RNTI).

In one example, the UE 116 can determine whether or not
to perform DL positioning measurement, and/or UL SRS
transmission, and/or DL positioning measurement reporting,
based on an explicit indication in the PDSCH of paging.

Figure 10:
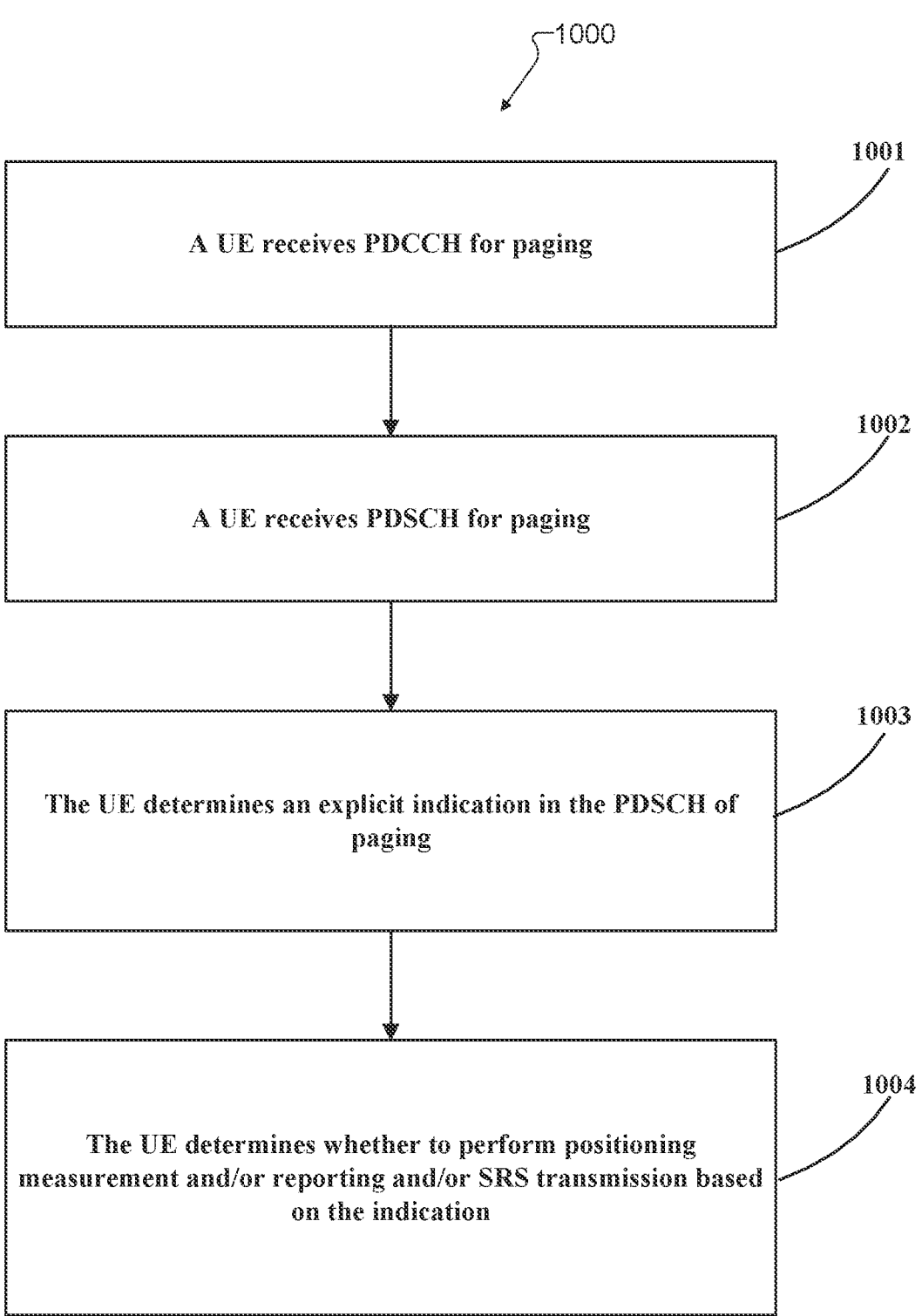
FIG. 10 illustrates a flowchart of an example UE procedure for paging PDSCH based positioning according to embodiments of the present disclosure.

FIG. 10 illustrates a flowchart of an example UE proce-
dure 1000 for paging PDSCH based positioning according to embodiments of the present disclosure. For example, pro-
cedure 1000 can be utilized by any of the UEs 111-116 of
FIG. 1 for paging DCI based positioning. This example is for
illustration only and other embodiments can be used without
departing from the scope of the disclosure.

The procedure begins with step 1001, the UE 116 can first
receive the PDCCH of paging. In step 1002, the UE 116 then
receives the PDSCH of paging. In step 1003, the UE 116
then determines an explicit indication of whether or not to
perform DL positioning measurement, and/or SRS transmis-
sion, and/or DL positioning measurement reporting, based
on an explicit indication in the PDSCH of paging. In step
1004, the UE 116 then performs DL positioning measure-
ment, and/or SRS transmission, and/or DL positioning mea-
surement reporting, if indicated by the PDSCH of paging.

In one sub-example, the explicit indication includes
whether the UE 116 performs DL PRS measurement in a
particular PRS measurement occasion.

In one instance, the PRS measurement occasion is the
next one after receiving the PDSCH of paging.

In another instance, the PRS measurement occasion is the
next one after receiving the PDSCH of paging with a
delay, wherein the delay can be either fixed or config-
ured.

In yet another instance, the PRS measurement occasion
can be indicated by the PDSCH of paging, e.g., using
a time-domain offset from receiving the PDSCH of
paging.

In yet another instance, the PRS in the PRS measurement
occasion can be QCLed with the DMRS of the PDSCH
of paging.

In another sub-example, the explicit indication includes
whether the UE 116 performs DL PRS measurement in the
associated paging cycle (e.g., the paging cycle where the
PDSCH of paging is located).

In yet another sub-example, the explicit indication
includes whether the UE 116 performs DL PRS measure-
ment in the associated DRX cycle and/or eDRX cycle (e.g.,
the DRX cycle and/or eDRX cycle where the PDSCH of
paging is located).

In yet another sub-example, the explicit indication
includes whether the UE 116 performs DL PRS measure-
ment in an associated time-domain window.

In one instance, the time-domain window can be config-
ured by SIB (e.g., SIB1).

In another instance, the time-domain window can be fixed
in the specification (e.g., one slot or a fixed number of
slots).

In yet another instance, the time-domain window can be
configured by dedicated RRC (e.g., maintaining the
configuration when RRC releases).

In yet another instance, the time-domain window can be
indicated in the PDSCH of paging.

In one sub-example, the explicit indication includes
whether the UE 116 reports DL PRS measurement in a
particular PRS measurement reporting occasion.

In one instance, the PRS measurement reporting occasion
is the next associated one after receiving PDSCH of
paging.

In another instance, the PRS measurement reporting occa-
sion is the next associated one after receiving PDSCH
of paging with a delay, wherein the delay can be either
fixed or configured.

In yet another instance, the PRS measurement reporting
occasion can be indicated by the PDSCH of paging,
e.g., using a time-domain offset from receiving the
PDSCH of paging.

In yet another instance, the RS in the PRS measurement reporting occasion can be QCLed with the DMRS of the PDSCH of paging.

In another sub-example, the explicit indication includes whether the UE 116 reports DL PRS measurement in the associated paging cycle (e.g., the paging cycle where the PDSCH of paging is located).

In yet another sub-example, the explicit indication includes whether the UE 116 reports DL PRS measurement in the associated DRX cycle and/or eDRX cycle (e.g., the DRX cycle and/or eDRX cycle where the PDSCH of paging is located).

In yet another sub-example, the explicit indication includes whether the UE 116 reports DL PRS measurement in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In yet another instance, the time-domain window can be indicated in the PDSCH of paging.

In one sub-example, the explicit indication includes whether the UE 116 transmits SRS in a particular SRS transmission occasion.

In one instance, the SRS transmission occasion is the next one after receiving the PDSCH of paging.

In another instance, the SRS transmission occasion is the next one after receiving the PDSCH of paging with a delay, wherein the delay can be either fixed or configured.

In yet another instance, the SRS transmission occasion can be indicated by the PDSCH of paging, e.g., using a time-domain offset.

In yet another instance, the SRS in the SRS transmission occasion can be QCLed with the DMRS of the PDSCH of paging.

In another sub-example, the explicit indication includes whether the UE 116 transmits SRS in the associated paging cycle (e.g., the paging cycle where the PDSCH of paging is located).

In yet another sub-example, the explicit indication includes whether the UE 116 transmits SRS in the associated DRX cycle and/or eDRX cycle (e.g., the DRX cycle and/or eDRX cycle where the PDSCH of paging is located).

In yet another sub-example, the explicit indication includes whether the UE 116 transmits SRS in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In yet another instance, the time-domain window can be indicated in the PDSCH of paging.

In one sub-example, the explicit indication for whether or not to perform DL positioning measurement, and/or SRS transmission, and/or DL positioning measurement reporting can be a common indication. The UE 116 determines whether or not to perform DL positioning measurement, and/or SRS transmission, and/or DL positioning measurement reporting jointly based on the indication.

In another sub-example, the explicit indication for whether or not to perform DL positioning measurement, and/or SRS transmission, and/or DL positioning measurement reporting can be a separate indication in the PDSCH of paging, e.g., one bit for each purpose, correspondingly.

In yet another sub-example, part of the explicit indication for whether or not to perform DL positioning measurement, and/or SRS transmission, and/or DL positioning measurement reporting can be a common indication, and the remaining can use a separate indication, in the PDSCH of paging. For one instance, whether or not to perform DL positioning measurement and DL positioning measurement reporting can use a joint indication. For another instance, whether or not to perform SRS transmission and DL positioning measurement reporting can use a joint indication.

In another example, the UE 116 can determine to perform DL positioning measurement, and/or SRS transmission, and/or DL positioning measurement reporting, based on an implicit indication, wherein the implicit indication can be the reception of the PDSCH of paging; otherwise (e.g., if the UE 116 doesn't receive the PDSCH of paging), the UE 116 can skip performing DL positioning measurement, and/or SRS transmission, and/or DL positioning measurement reporting.

In one sub-example, if the UE 116 does not receive the PDSCH of paging, the UE 116 can skip performing DL PRS measurement in a particular PRS measurement occasion; and/or if the UE 116 receives the PDSCH of paging, the UE 116 can perform DL PRS measurement in a particular PRS measurement occasion.

In one instance, the PRS measurement occasion is the next one after the occasion to receive the PDSCH of paging.

In another instance, the PRS measurement occasion is the next one after the occasion to receive the PDSCH of paging with a delay, wherein the delay can be either fixed or configured.

In yet another instance, the PRS in the PRS measurement occasion can be QCLed with the DMRS of the PDSCH of paging.

In another sub-example, if the UE 116 doesn't receive the PDSCH of paging, the UE 116 can skip performing DL PRS measurement in the associated paging cycle (e.g., the paging cycle where the PDSCH of paging is located); and/or if the UE 116 receives the PDSCH of paging, the UE 116 can perform DL PRS measurement in the associated paging cycle.

In yet another sub-example, if the UE 116 doesn't receive the PDSCH of paging, the UE 116 can skip performing DL PRS measurement in the associated DRX cycle and/or eDRX cycle (e.g., the DRX cycle and/or eDRX cycle where the PDSCH of paging is located); and/or if the UE 116 receives the PDSCH of paging, the UE 116 can perform DL PRS measurement in the associated DRX cycle and/or eDRX cycle.

In yet another sub-example, if the UE 116 does not receive the PDSCH of paging, the UE 116 can skip performing DL PRS measurement in an associated time-domain window; and/or if the UE 116 receives the PDSCH of paging, the UE 116 can perform DL PRS measurement in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In one sub-example, if the UE 116 does not receive the PDSCH of paging, the UE 116 can skip reporting DL PRS measurement in a particular PRS measurement reporting occasion; and/or if the UE 116 receives the PDSCH of paging, the UE 116 can report DL PRS measurement in a particular PRS measurement reporting occasion.

In one instance, the PRS measurement reporting occasion is the next one after the occasion to receive the PDSCH of paging.

In another instance, the PRS measurement reporting occasion is the next one after the occasion to receive the PDSCH of paging with a delay, wherein the delay can be either fixed or configured.

In yet another instance, the PRS in the PRS measurement reporting occasion can be QCLed with the DMRS of the PDSCH of paging.

In another sub-example, if the UE 116 doesn't receive the PDSCH of paging, the UE 116 can skip reporting DL PRS measurement in the associated paging cycle (e.g., the paging cycle where the PDSCH of paging is located); and/or if the UE 116 receives the PDSCH of paging, the UE 116 can report DL PRS measurement in the associated paging cycle.

In yet another sub-example, if the UE 116 doesn't receive the PDSCH of paging, the UE 116 can skip reporting DL PRS measurement in the associated DRX cycle and/or eDRX cycle (e.g., the DRX cycle and/or eDRX cycle where the PDSCH of paging is located); and/or if the UE 116 receives the PDSCH of paging, the UE 116 can report DL PRS measurement in the associated DRX cycle and/or eDRX cycle.

In yet another sub-example, if the UE 116 does not receive the PDSCH of paging, the UE 116 can skip reporting DL PRS measurement in an associated time-domain window; and/or if the UE 116 receives the PDSCH of paging, the UE 116 can report DL PRS measurement in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In one sub-example, if the UE 116 does not receive the PDSCH of paging, the UE 116 can skip SRS transmission in a particular SRS transmission occasion; and/or if the UE 116 receives the PDSCH of paging, the UE 116 can perform SRS transmission in a particular SRS transmission occasion.

In one instance, the SRS transmission occasion is the next one after the occasion to receive the PDSCH of paging.

In another instance, the SRS transmission occasion is the next one after the occasion to receive the PDSCH of paging with a delay, wherein the delay can be either fixed or configured.

In yet another instance, the SRS in the SRS transmission occasion can be QCLed with the DMRS of the PDSCH of paging.

In another sub-example, if the UE 116 doesn't receive the PDSCH of paging, the UE 116 can skip SRS transmission in the associated paging cycle (e.g., the paging cycle where the PDSCH of paging is located); and/or if the UE 116 receives the PDSCH of paging, the UE 116 can perform SRS transmission in the associated paging cycle.

In yet another sub-example, if the UE 116 doesn't receive the PDSCH of paging, the UE 116 can skip SRS transmission in the associated DRX cycle and/or eDRX cycle (e.g., the DRX cycle and/or eDRX cycle where the PDSCH of paging is located); and/or if the UE 116 receives the PDSCH of paging, the UE 116 can perform SRS transmission in the associated DRX cycle and/or eDRX cycle.

In yet another sub-example, if the UE 116 does not receive the PDSCH of paging, the UE 116 can skip SRS transmission in an associated time-domain window; and/or if the UE 116 receives the PDSCH of paging, the UE 116 can perform SRS transmission in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

Embodiments of the present disclosure recognize in Rel-17, NR introduced the mechanism of paging early indication (PEI), such that the UEs are further divided into sub-groups within a PO, and the UE can skip monitoring the paging PDCCH based on the indication in PEI. PEI is provided by the DCI format 2_7 CRC scrambled by PEI-RNTI.

To improve power efficiency at least in RRC_IDLE and/or RRC_INACTIVE modes, the UE can associate the DL and/or UL positioning procedures with PEI procedure. The UE can skip some of the DL positioning measurement, and/or UL SRS transmission, and/or DL positioning measurement reporting, based on the indication in PEI.

Embodiments of the present disclosure focus on the design of positioning triggered by paging early indication, in order to save power at the UE side. More precisely, the following approaches are included in the embodiments of the present disclosure:

Procedure for paging early indication based positioning.

Explicit indication in the PEI.

Implicit indication based on PEI.

Combination of paging based positioning and PEI based positioning.

Figure 11:
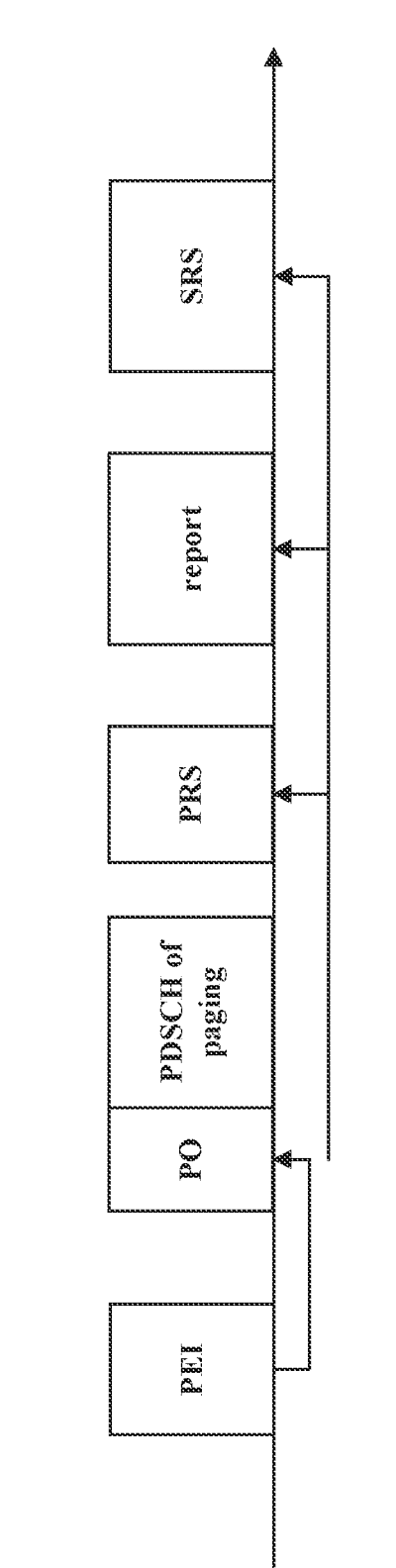
FIG. 11 illustrates an example of paging early indication (PEI) based positioning according to embodiments of the present disclosure.

FIG. 11 illustrates an example timeline 1100 for PEI based positioning according to embodiments of the present disclosure. For example, the timeline 1100 for PEI based positioning can be utilized by the gNB 102 and the UE 116. This example is for illustration only and other embodiments can be used without departing from the scope of the disclosure.

In one embodiment, a UE can determine whether or not to perform DL positioning measurement, and/or UL SRS transmission, and/or DL positioning measurement reporting, based on PEI (e.g., DCI format 2_7 with CRC scrambled by PEI-RNTI).

Figure 12:
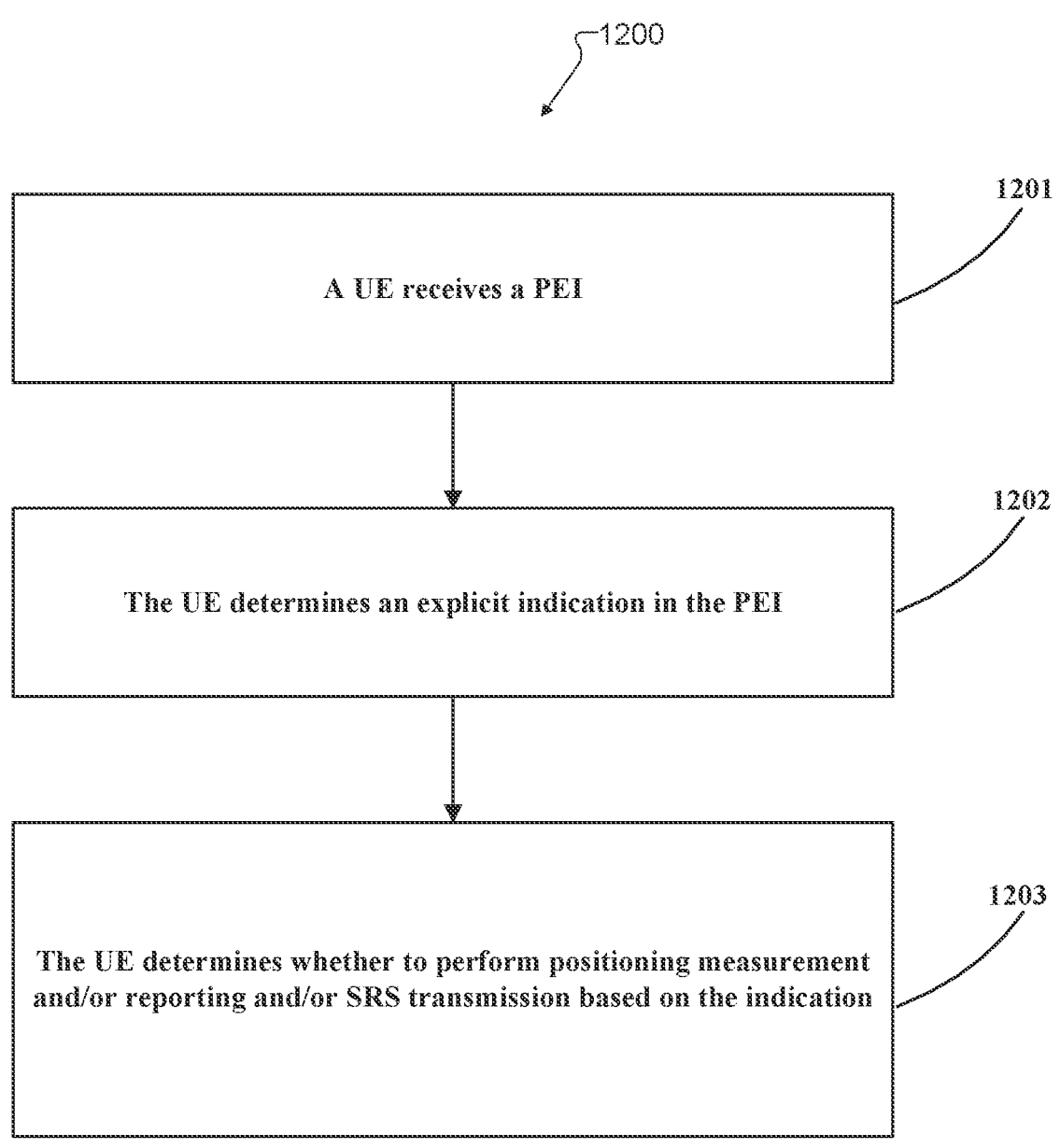
FIG. 12 illustrates a flowchart of an example UE procedure for PEI based positioning according to embodiments of the present disclosure.

FIG. 12 illustrates a flowchart of an example UE procedure 1200 for PEI based positioning according to embodiments of the present disclosure. For example, procedure 1200 can be performed by any of the UEs 111-116. This example is for illustration only and other embodiments can be used without departing from the scope of the disclosure.

In one example, the UE 116 can determine whether or not to perform DL positioning measurement, and/or UL SRS transmission, and/or DL positioning measurement reporting, based on an explicit indication in the PEI for paging (e.g., PEI 1_0 with CRC scrambled by P-RNTI).

The process begins in step 1201, the UE 116 can first receive the PEI. In step 1202, the UE 116 then determines an explicit indication of whether or not to perform DL positioning measurement, and/or SRS transmission, and/or DL positioning measurement reporting, based on an explicit indication in the PEI. In step 1203, the UE 116 then performs DL positioning measurement, and/or SRS transmission, and/or DL positioning measurement reporting, if indicated by the PEI.

In one sub-example, the explicit indication in the PEI can be a field with $N_1 \cdot N_2$ bits, wherein $N_1$ can be a number of paging occasions configured by higher layer parameter and $N_2$ can be a number of sub-groups of paging occasions configured by higher layer parameter. Each bit in the fields corresponds to a UE sub-group and indicates the UE 116 in the corresponding UE sub-group whether or not to perform DL positioning measurement, and/or SRS transmission, and/or DL positioning measurement reporting.

In another sub-example, the explicit indication in the PEI can be a field with $N_1$ bits, wherein $N_1$ can be a number of paging occasions configured by higher layer parameter. Each bit in the fields corresponds to a UE group and indicates to the UE 116 in the corresponding UE group whether or not to perform DL positioning measurement, and/or SRS transmission, and/or DL positioning measurement reporting.

In yet another sub-example, the explicit indication in the PEI can be a field with 1 bit (e.g., if this feature is enabled or configured) and indicates to the UE 116 in all the UE 116 sub-groups provided by the paging indication field whether or not to perform DL positioning measurement, and/or SRS transmission, and/or DL positioning measurement reporting.

In one sub-example, the explicit indication includes whether the UE 116 performs DL PRS measurement in a particular PRS measurement occasion.

In one instance, the PRS measurement occasion is the next one after receiving the PEI.

In another instance, the PRS measurement occasion is the next one after receiving the PEI with a delay, wherein the delay can be either fixed or configured.

In yet another instance, the PRS measurement occasion can be indicated by the PEI, e.g., using a time-domain offset from receiving the PEI.

In yet another instance, the PRS in the PRS measurement occasion can be QCLed with the DMRS of the PDCCH carrying the PEI.

In another sub-example, the explicit indication includes whether the UE 116 performs DL PRS measurement in the associated paging cycle (e.g., the paging cycle where the PEI is located).

In yet another sub-example, the explicit indication includes whether the UE 116 performs DL PRS measurement in the associated DRX cycle and/or eDRX cycle (e.g., the DRX cycle and/or eDRX cycle where the PEI is located).

In yet another sub-example, the explicit indication includes whether the UE 116 performs DL PRS measurement in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In yet another instance, the time-domain window can be indicated in the PEI.

In one sub-example, the explicit indication includes whether the UE 116 reports DL PRS measurement in a particular PRS measurement reporting occasion.

In one instance, the PRS measurement reporting occasion is the next associated one after receiving PEI.

In another instance, the PRS measurement reporting occasion is the next associated one after receiving PEI with a delay, wherein the delay can be either fixed or configured.

In yet another instance, the PRS measurement reporting occasion can be indicated by the PEI, e.g., using a time-domain offset from receiving the PEI.

In yet another instance, the RS in the PRS measurement reporting occasion can be QCLed with the DMRS of the PDCCH carrying the PEI.

In another sub-example, the explicit indication includes whether the UE 116 reports DL PRS measurement in the associated paging cycle (e.g., the paging cycle where the PEI is located).

In yet another sub-example, the explicit indication includes whether the UE 116 reports DL PRS measurement in the associated DRX cycle and/or eDRX cycle (e.g., the DRX cycle and/or eDRX cycle where the PEI is located).

In yet another sub-example, the explicit indication includes whether the UE 116 reports DL PRS measurement in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In yet another instance, the time-domain window can be indicated in the PEI.

In one sub-example, the explicit indication includes whether the UE 116 transmits SRS in a particular SRS transmission occasion.

In one instance, the SRS transmission occasion is the next one after receiving the PEI.

In another instance, the SRS transmission occasion is the next one after receiving the PEI with a delay, wherein the delay can be either fixed or configured.

In yet another instance, the SRS transmission occasion can be indicated by the PEI, e.g., using a time-domain offset.

In yet another instance, the SRS in the SRS transmission occasion can be QCLed with the DMRS of the PDCCH carrying the PEI.

In another sub-example, the explicit indication includes whether the UE 116 transmits SRS in the associated paging cycle (e.g., the paging cycle where the PEI is located).

In yet another sub-example, the explicit indication includes whether the UE 116 transmits SRS in the associated DRX cycle and/or eDRX cycle (e.g., the DRX cycle and/or eDRX cycle where the PEI is located).

In yet another sub-example, the explicit indication includes whether the UE 116 transmits SRS in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In yet another instance, the time-domain window can be indicated in the PEI.

In one sub-example, the explicit indication for whether or not to perform DL positioning measurement, and/or SRS transmission, and/or DL positioning measurement reporting can be a common indication. The UE 116 determines whether or not to perform DL positioning measurement, and/or SRS transmission, and/or DL positioning measurement reporting jointly based on the indication.

In another sub-example, the explicit indication for whether or not to perform DL positioning measurement, and/or SRS transmission, and/or DL positioning measurement reporting can be a separate indication in the PEI, e.g., different set of bit(s) for each purpose, correspondingly.

In yet another sub-example, part of the explicit indication for whether or not to perform DL positioning measurement, and/or SRS transmission, and/or DL positioning measurement reporting can be a common indication, and the remaining can use a separate indication, in the PEI. For one instance, whether or not to perform DL positioning measurement and DL positioning measurement reporting can use a joint indication. For another instance, whether or not to perform SRS transmission and DL positioning measurement reporting can use a joint indication.

In another example, the UE 116 can determine to perform DL positioning measurement, and/or SRS transmission, and/or DL positioning measurement reporting, based on an implicit indication, wherein the implicit indication can reuse the paging indication field in the PEI. For instance, if a UE is indicated to perform paging by the paging indication field in the PEI, the UE 116 can perform DL positioning measurement, and/or SRS transmission, and/or DL positioning measurement reporting; otherwise (e.g., if a UE is not indicated to perform paging by the paging indication field in the PEI), the UE 116 can skip performing DL positioning measurement, and/or SRS transmission, and/or DL positioning measurement reporting.

In another example, the UE 116 can determine to perform DL positioning measurement, and/or SRS transmission, and/or DL positioning measurement reporting, based on an implicit indication, wherein the implicit indication can be the reception of the PEI for paging (e.g., PEI 1_0 with CRC scrambled by P-RNTI); otherwise (e.g., if the UE 116 doesn't receive the PEI for paging), the UE 116 can skip performing DL positioning measurement, and/or SRS transmission, and/or DL positioning measurement reporting.

In one sub-example for the examples using implicit indication, the UE 116 can perform or skip performing DL PRS measurement in a particular PRS measurement occasion.

In one instance, the PRS measurement occasion is the next one after the occasion to receive the PEI.

In another instance, the PRS measurement occasion is the next one after the occasion to receive the PEI with a delay, wherein the delay can be either fixed or configured.

In yet another instance, the PRS in the PRS measurement occasion can be QCLed with the DMRS of the PDCCH carrying the PEI.

In another sub-example for the examples using implicit indication, the UE 116 can perform or skip performing DL PRS measurement in the associated paging cycle.

In yet another sub-example for the examples using implicit indication, the UE 116 can perform or skip performing DL PRS measurement in the associated DRX cycle and/or eDRX cycle.

In yet another sub-example for the examples using implicit indication, the UE 116 can perform or skip performing DL PRS measurement in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In one sub-example for the examples using implicit indication, the UE 116 can report or skip reporting DL PRS measurement in a particular PRS measurement reporting occasion.

In one instance, the PRS measurement reporting occasion is the next one after the occasion to receive the PEI.

In another instance, the PRS measurement reporting occasion is the next one after the occasion to receive the PEI with a delay, wherein the delay can be either fixed or configured.

In yet another instance, the PRS in the PRS measurement reporting occasion can be QCLed with the DMRS of the PDCCH carrying the PEI.

In another sub-example for the examples using implicit indication, the UE 116 can report or skip reporting DL PRS measurement in the associated paging cycle.

In yet another sub-example for the examples using implicit indication, the UE 116 can report or skip reporting DL PRS measurement in the associated DRX cycle and/or eDRX cycle.

In yet another sub-example for the examples using implicit indication, the UE 116 can report or skip reporting DL PRS measurement in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In one sub-example for the examples using implicit indication, the UE 116 can transmit or skip transmitting SRS in a particular SRS transmission occasion.

In one instance, the SRS transmission occasion is the next one after the occasion to receive the PEI.

In another instance, the SRS transmission occasion is the next one after the occasion to receive the PEI with a delay, wherein the delay can be either fixed or configured.

In yet another instance, the SRS in the SRS transmission occasion can be QCLed with the DMRS of the PDCCH carrying the PEI.

In another sub-example for the examples using implicit indication, the UE 116 can transmit or skip transmitting SRS in the associated paging cycle.

In yet another sub-example for the examples using implicit indication, the UE 116 can transmit or skip transmitting SRS in the associated DRX cycle and/or eDRX cycle.

In yet another sub-example for the examples using implicit indication, the UE 116 can transmit or skip transmitting SRS in an associated time-domain window.

In one instance, the time-domain window can be configured by SIB (e.g., SIB1).

In another instance, the time-domain window can be fixed in the specification (e.g., one slot or a fixed number of slots).

In yet another instance, the time-domain window can be configured by dedicated RRC (e.g., maintaining the configuration when RRC releases).

In one embodiment, the approach based on the PEI to determine whether or not to perform DL positioning measurement, and/or UL SRS transmission, and/or DL positioning measurement reporting, can be combined with the approach based on the paging related channel (e.g., paging DCI, and/or short message, and/or paging PDSCH) to determine whether or not to perform DL positioning measurement, and/or UL SRS transmission, and/or DL positioning measurement reporting.

For one example, if a UE is configured to monitor PDCCH carrying PEI, but didn't receive the PEI, the UE 116 can receive paging related channel (e.g., paging DCI, and/or short message, and/or paging PDSCH) to determine whether or not to perform DL positioning measurement, and/or UL SRS transmission, and/or DL positioning measurement reporting, based on the paging related channel (e.g., paging DCI, and/or short message, and/or paging PDSCH), e.g., in an explicit way or an implicit way.

For another example, if a UE is configured to monitor PDCCH carrying PEI, and determines whether or not to perform DL positioning measurement, and/or UL SRS transmission, and/or DL positioning measurement reporting, based on PEI (e.g., in an explicit way or an implicit way as described in this disclosure), and the UE 116 can further determine whether or not to perform DL positioning measurement, and/or UL SRS transmission, and/or DL positioning measurement reporting, based on the paging related channel (e.g., paging DCI, and/or short message, and/or paging PDSCH), e.g., in an explicit way or an implicit way, then the UE 116 assumes the information determined from two approaches is the same.

For yet another example, if a UE is configured to monitor PDCCH carrying PEI, and determines whether or not to perform DL positioning measurement, and/or UL SRS transmission, and/or DL positioning measurement reporting, based on PEI (e.g., in an explicit way or an implicit way as described in this disclosure), and the UE 116 can further determines whether or not to perform DL positioning measurement, and/or UL SRS transmission, and/or DL positioning measurement reporting, based on the paging related channel (e.g., paging DCI, and/or short message, and/or paging PDSCH), e.g., in an explicit way or an implicit way, then the UE 116 assumes the information determined from PEI based approach overrides the information determined from paging related channel based approach.

For yet another example, if a UE is configured to monitor PDCCH carrying PEI, and determines whether or not to perform DL positioning measurement, and/or UL SRS transmission, and/or DL positioning measurement reporting, based on PEI (e.g., in an explicit way or an implicit way as described in this disclosure), and the UE 116 can further determines whether or not to perform DL positioning measurement, and/or UL SRS transmission, and/or DL positioning measurement reporting, based on the paging related channel (e.g., paging DCI, and/or short message, and/or paging PDSCH), e.g., in an explicit way or an implicit way, then the UE 116 assumes the information determined from paging related channel based approach overrides the information determined from PEI based approach.

To improve power efficiency at least in RRC_IDLE and/or RRC_INACTIVE modes, the UE 116 may need to adapt the configuration for DL and/or UL positioning. The adaptation for DL and/or UL positioning can also be combined with the adaptation for other procedures in RRC_IDLE and/or RRC_INACTIVE modes, e.g., paging.

Embodiment of the present disclosure focus on the design of adaptation of positioning configuration, in order to save power at the UE 116 side. More precisely, the following aspects are included:

Procedure for adaptation of positioning configurations.

Trigger for adaptation of positioning configurations.

Semi-static trigger.

Dynamic trigger.

Combination of multiple triggers.

Transition delay for adaptation of positioning configurations.

Components for adaptation of positioning configurations.

PRS based measurement.

PRS measurement report.

SRS transmission.

Paging configuration.

PEI configuration.

UE's feedback for receiving the trigger.

Figure 13:
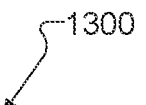
FIG. 13 illustrates a flowchart of an example UE procedure for adaptation of positioning according to embodiments of the present disclosure.
Figure 13:
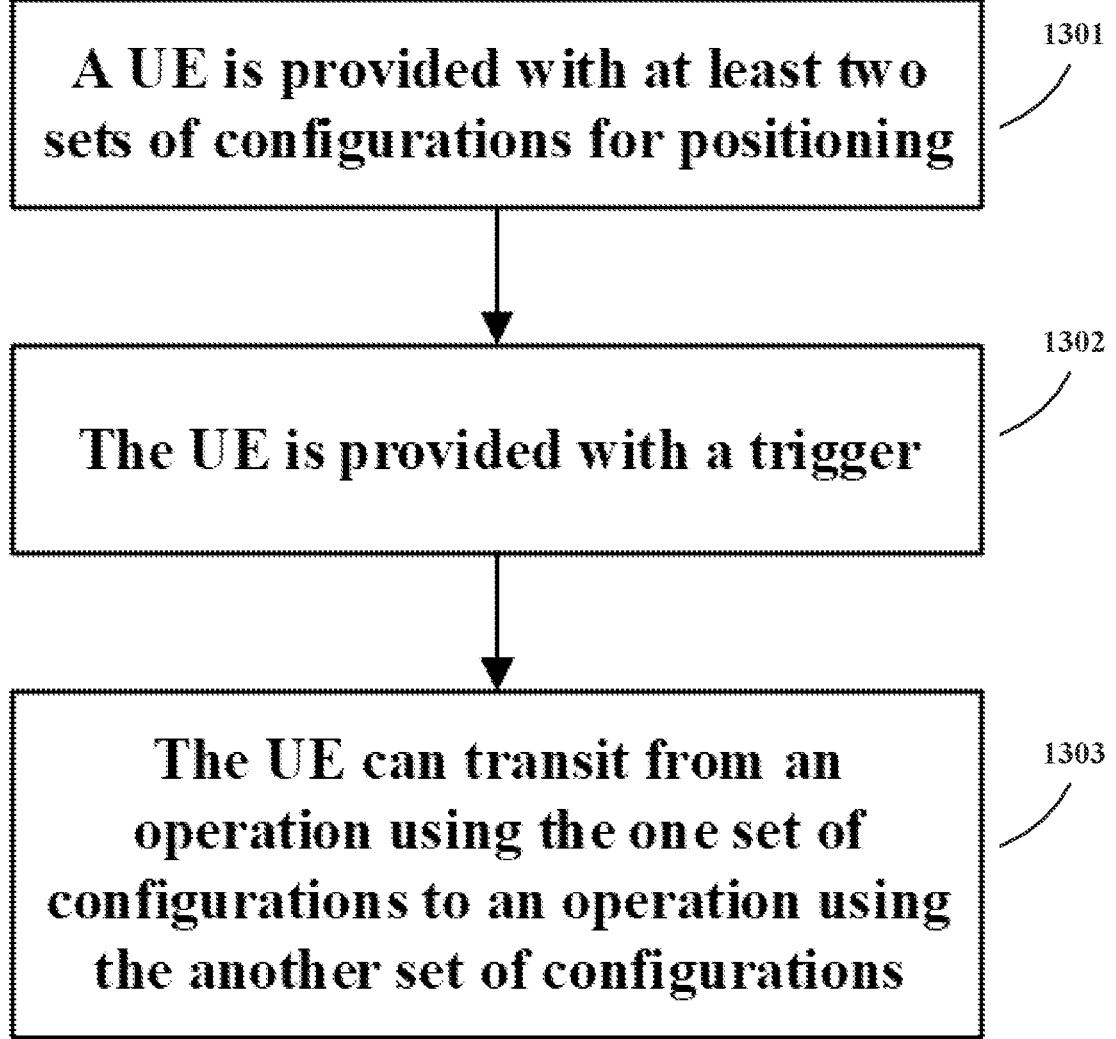

FIG. 13 illustrates a flowchart of an example UE procedure 1300 for adaptation of positioning according to embodiments of the present disclosure. For example, procedure 1300 can be performed by an of the UEs 111-116 for adaptation of positioning. This example is for illustration only and other embodiments can be used without departing from the scope of the disclosure.

The procedure begins in step 1301, a UE is provided with at least two sets of configurations for positioning (e.g., including DL PRS based positioning measurement, and/or DL positioning reporting, and/or UL SRS transmission), wherein the at least two sets of configurations include a first set of configurations and a second set of configurations. Then, in step 1302, the UE 116 is provided with a trigger. In step 1303, the UE 116 can then transit from an operation using the first set of configurations to an operation using the second set of configurations, and/or the UE 116 can transit from an operation using the second set of configurations to an operation using the first set of configurations.

For one example, one set of configurations within the at least two set of configurations can be by default. In one instance, the default set of configurations can be fixed in the specifications. In another instance, the default set of configurations can be provided by higher layer parameters.

For another example, the at least two set of configurations can be provided by higher layer parameters.

For one example, the adaptation of positioning is applicable to the UE 116 at least in one of RRC_IDLE state or RRC_INACTIVE state.

In another embodiment, a UE can be provided with a first set of configurations for positioning (e.g., including DL PRS based positioning measurement, and/or DL positioning reporting, and/or UL SRS transmission), and then the UE 116 can be provided with a trigger, wherein the trigger includes a second set of configurations for positioning, such that the UE 116 can transit from an operation using the first set of configurations to an operation using the second set of configurations, and/or the UE 116 can transit from an operation using the second set of configurations to an operation using the first set of configurations.

For one example, the first set of configurations can be provided by higher layer parameters. For another example, the second set of configurations can be fixed in the specification, e.g., including no resources for DL PRS based positioning measurement, and/or DL positioning reporting, and/or UL SRS transmission.

Figure 14:
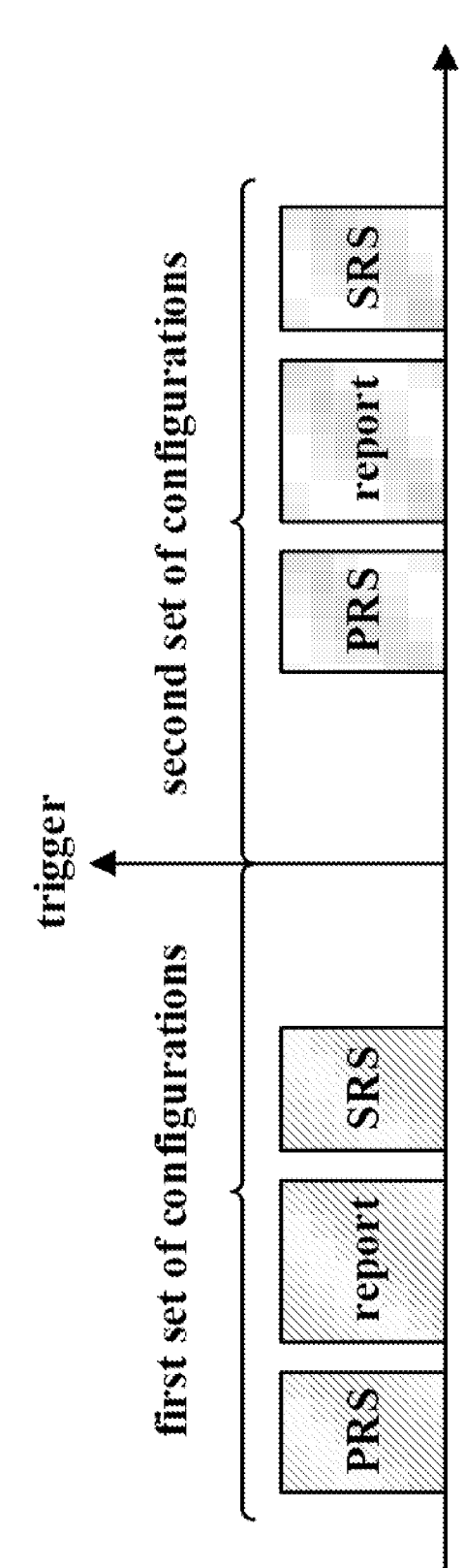
FIG. 14 illustrates an example of an adaptation of positioning according to embodiments of the present disclosure.

FIG. 14 illustrates an example timeline 1400 for an adaptation of positioning according to embodiments of the present disclosure. For example, timeline 1400 for an adaptation of positioning can be utilized by the gNB 102 and any of the UEs 111-116 for improving power efficiency. This example is for illustration only and other embodiments can be used without departing from the scope of the disclosure.

For one example, the adaptation of positioning is applicable to the UE 116 at least in one of RRC_IDLE state or RRC_INACTIVE state.

In one embodiment, the trigger can be provided to the UE 116 in a semi-static way.

For one example, the trigger can be a timing. When the UE 116's timing is aligned with the trigger, the UE 116 can determine to transit from an operation using the first set of configurations to an operation using the second set of configurations, and/or to transit from an operation using the second set of configurations to an operation using the first set of configurations, with a potential delay as described in one or more examples herein.

In one instance, the timing can be the start or the end of a frame.

In another instance, the timing can be the start of the end of a half frame.

In yet another instance, the timing can be the start or the end of a slot.

In yet another instance, the timing can be the start or the end of a OFDM symbol.

In yet another instance, the timing can be the start or the end of a configured period.

In yet another instance, the timing can be the start or the end of a time period within a configured pattern, e.g., a pattern of the time periods using the first and/or the second set of configurations.

In another embodiment, the trigger can be provided to the UE 116 in a dynamic way.

For one example, the trigger can be a PDCCH carrying a DCI format and the UE 116 can be configured to monitor the PDCCH in a search space set. If the UE 116 receives the PDCCH, the UE 116 can determine to transit from an operation using the first set of configurations to an operation using the second set of configurations, and/or to transit from an operation using the second set of configurations to an operation using the first set of configurations, with a potential delay as described in one or more examples herein.

For one further contemplation, the DCI format can explicitly include a field to indicate which set of configurations to use.

For another further contemplation, the DCI format can explicitly include a field to indicate whether to switch the set of configurations to use.

For yet another further contemplation, the DCI format do not include an explicit indication, and its reception by the UE 116 is the trigger for adaption of the set of configurations.

For one further contemplation, the DCI format can be a DCI format with CRC scrambled by a cell-specific RNTI or a UE-group-specific RNTI.

In one instance, the DCI format can be the DCI format 0_0 with CRC scrambled by cell radio network temporary identifier (C-RNTI), and/or configured scheduling radio network temporary identifier (CS-RNTI), and/or modulating and coding scheme common radio network temporary identifier (MCS-C-RNTI).

In another instance, the DCI format can be the DCI format 0_0 with CRC scrambled by P-RNTI.

In yet another instance, the DCI format can be the DCI format 0_0 with CRC scrambled by system information radio network temporary identifier (SI-RNTI).

In yet another instance, the DCI format can be the DCI format 0_0 with CRC scrambled by RA-RNTI, and/or MsgB-RNTI.

In yet another instance, the DCI format can be the DCI format 0_0 with CRC scrambled by temporary cell radio network temporary identifier (TC-RNTI).

In yet another instance, the DCI format can be the DCI format 1_0 with CRC scrambled by C-RNTI, and/or CS-RNTI, and/or MCS-C-RNTI.

In yet another instance, the DCI format can be the DCI format 1_2 with CRC scrambled by C-RNTI, and/or CS-RNTI, and/or MCS-C-RNTI.

In yet another instance, the DCI format can be the DCI format 2_0 with CRC scrambled by short feedback information radio network temporary identifier (SFI-RNTI).

In yet another instance, the DCI format can be the DCI format 2_7 with CRC scrambled by PEI-RNTI.

In yet another instance, the DCI format can be a new DCI format with CRC scrambled by a cell-specific RNTI or a UE-group-specific RNTI.

For another further contemplation, a UE can be provided with at least one of the following for detection of the DCI format as the trigger.

In one instance, the UE 116 can be provided with a search space set to monitor PDCCH for detection of the DCI format. For one sub-instance, the search space set can be according to a Type2-PDCCH CSS. For another sub-instance, the search space set can be according to a Type2A-PDCCH CSS. For yet another sub-instance, the search space set can be according to a Type3-PDCCH CSS.

In another instance, the UE 116 can be provided with a number of frames, e.g., as the offset to determine the frame including the PDCCH monitoring occasions.

In yet another instance, the UE 116 can be provided with a number of symbols, e.g., from the start of the frame to the start of the first PDCCH monitoring occasion.

In yet another instance, the UE 116 can be provided with a payload size.

For another example, the trigger can be determined based on a time duration provided by a DCI format carried by a PDCCH and the UE 116 can be configured to monitor the PDCCH in a search space set. If the UE 116 receives the PDCCH and determines the time duration, the UE 116 can determine a timing based on the time duration (e.g., the time instance that is later than the reception of the PDCCH by the time duration) to transit from an operation using the first set of configurations to an operation using the second set of configurations, and/or to transit from an operation using the second set of configurations to an operation using the first set of configurations, with a potential delay as described in the disclosure.

For one further contemplation, the DCI format can explicitly include a field to indicate which set of configurations to use. For the time within the duration, the UE 116 uses the set of configurations indicated by the DCI format; and for the time after the duration, the UE 116 use the other set of configurations not indicated by the DCI format.

For another further contemplation, the DCI format can explicitly include a field to indicate whether to switch the set of configurations to use. For the time within the duration, the UE 116 switches to a set of configurations different from the current set of configurations; and for the time after the duration, the UE 116 switches back to the current set of configurations.

For yet another further contemplation, the DCI format do not include an explicit indication, and its reception by the UE 116 is the trigger for adaption of the set of configurations. For the time within the duration, the UE 116 switches to a set of configurations different from the current set of configurations; and for the time after the duration, the UE 116 switches back to the current set of configurations.

For one further contemplation, the DCI format can be a DCI format with CRC scrambled by a cell-specific RNTI or a UE-group-specific RNTI.

In one instance, the DCI format can be the DCI format 0_0 with CRC scrambled by C-RNTI, and/or CS-RNTI, and/or MCS-C-RNTI.

In another instance, the DCI format can be the DCI format 0_0 with CRC scrambled by P-RNTI.

In yet another instance, the DCI format can be the DCI format 0_0 with CRC scrambled by SI-RNTI.

In yet another instance, the DCI format can be the DCI format 0_0 with CRC scrambled by RA-RNTI, and/or MsgB-RNTI.

In yet another instance, the DCI format can be the DCI format 0_0 with CRC scrambled by TC-RNTI.

In yet another instance, the DCI format can be the DCI format 1_0 with CRC scrambled by C-RNTI, and/or CS-RNTI, and/or MCS-C-RNTI.

In yet another instance, the DCI format can be the DCI format 1_2 with CRC scrambled by C-RNTI, and/or CS-RNTI, and/or MCS-C-RNTI.

In yet another instance, the DCI format can be the DCI format 2_0 with CRC scrambled by SFI-RNTI.

In yet another instance, the DCI format can be the DCI format 2_7 with CRC scrambled by PEI-RNTI.

In yet another instance, the DCI format can be a new DCI format with CRC scrambled by a cell-specific RNTI or a UE-group-specific RNTI (e.g., a new RNTI).

For yet another example, the trigger can be a sequence based signal. If the UE 116 receives the signal, the UE 116 can determine to transit from an operation using the first set of configurations to an operation using the second set of configurations, and/or to transit from an operation using the second set of configurations to an operation using the first set of configurations, with a potential delay as described in one or more examples herein. If the UE 116 does not receive the signal, the UE 116 can maintain the operation using the current set of configurations.

In one instance, the signal can be generated based on M-sequence and carry physical cell ID (or partial physical cell ID) and/or UE group ID (or partial UE group ID).

In another instance, the signal can be generated based on PN-sequence and carry physical cell ID (or partial physical cell ID) and/or UE group ID (or partial UE group ID).

In yet another instance, the signal can be generated based on ZC-sequence and carry physical cell ID (or partial physical cell ID) and/or UE group ID (or partial UE group ID).

For another further contemplation, a UE can be provided with at least one of the following for detection of the DCI format as the trigger.

In one instance, the UE 116 can be provided with a search space set to monitor PDCCH for detection of the DCI format. For one sub-instance, the search space set can be according to a Type2-PDCCH CSS. For another sub-instance, the search space set can be according to a Type2A-PDCCH CSS. For yet another sub-instance, the search space set can be according to a Type3-PDCCH CSS.

In another instance, the UE 116 can be provided with a number of frames, e.g., as the offset to determine the frame including the PDCCH monitoring occasions.

In yet another instance, the UE 116 can be provided with a number of symbols, e.g., from the start of the frame to the start of the first PDCCH monitoring occasion.

In yet another instance, the UE 116 can be provided with a payload size.

For yet another example, the trigger can be a PDSCH scheduled by a PDCCH carrying a DCI format, and the UE 116 can be configured to monitor the PDCCH in a search space set. If the UE 116 receives the PDSCH, the UE 116 can determine to transit from an operation using the first set of configurations to an operation using the second set of configurations, and/or to transit from an operation using the second set of configurations to an operation using the first set of configurations, with a potential delay as described in the disclosure.

For one further contemplation, the data carried by PDSCH can explicitly include a field to indicate which set of configurations to use.

For another further contemplation, the data carried by PDSCH can explicitly include a field to indicate whether to switch the set of configurations to use.

For yet another further contemplation, the data carried by PDSCH do not include an explicit indication, and its reception by the UE 116 is the trigger for adaption of the set of configurations.

For one further contemplation, the DCI format can be a DCI format with CRC scrambled by a cell-specific RNTI or a UE-group-specific RNTI.

In one instance, the DCI format can be the DCI format 0_0 with CRC scrambled by C-RNTI, and/or CS-RNTI, and/or MCS-C-RNTI.

In another instance, the DCI format can be the DCI format 0_0 with CRC scrambled by P-RNTI.

In yet another instance, the DCI format can be the DCI format 0_0 with CRC scrambled by SI-RNTI.

In yet another instance, the DCI format can be the DCI format 0_0 with CRC scrambled by RA-RNTI, and/or MsgB-RNTI.

In yet another instance, the DCI format can be the DCI format 0_0 with CRC scrambled by TC-RNTI.

In yet another instance, the DCI format can be the DCI format 1_0 with CRC scrambled by C-RNTI, and/or CS-RNTI, and/or MCS-C-RNTI.

In yet another instance, the DCI format can be the DCI format 1_2 with CRC scrambled by C-RNTI, and/or CS-RNTI, and/or MCS-C-RNTI.

In yet another instance, the DCI format can be the DCI format 2_0 with CRC scrambled by SFI-RNTI.

In yet another instance, the DCI format can be the DCI format 2_7 with CRC scrambled by PEI-RNTI.

In yet another instance, the DCI format can be a new DCI format with CRC scrambled by a cell-specific RNTI or a UE-group-specific RNTI (e.g., a new RNTI).

For another further contemplation, a UE can be provided with at least one of the following for detection of the DCI format as the trigger.

In one instance, the UE 116 can be provided with a search space set to monitor PDCCH for detection of the DCI format. For one sub-instance, the search space set can be according to a Type2-PDCCH CSS. For another sub-instance, the search space set can be according to a Type2A-PDCCH CSS. For yet another sub-instance, the search space set can be according to a Type3-PDCCH CSS.

In another instance, the UE 116 can be provided with a number of frames, e.g., as the offset to determine the frame including the PDCCH monitoring occasions.

In yet another instance, the UE 116 can be provided with a number of symbols, e.g., from the start of the frame to the start of the first PDCCH monitoring occasion.

In yet another instance, the UE 116 can be provided with a payload size.

In one embodiment, a UE can be provided with a trigger in a semi-static way and a trigger in a dynamic way.

For one example, when a UE is provided with a trigger in a semi-static way and a trigger in a dynamic way, the UE 116 performs DL and/or UL positioning according to the trigger in the dynamic way.

For another example, when a UE is provided with a trigger in a semi-static way and a trigger in a dynamic way, the UE 116 performs DL and/or UL positioning according to the trigger in the semi-static way.

For yet another example, when a UE is provided with a trigger in a semi-static way and a trigger in a dynamic way, the UE 116 performs DL and/or UL positioning according to the trigger that occurs later and closest to the UE 116 (e.g., a later trigger overrides an earlier trigger).

For yet another example, when a UE is provided with a trigger in a semi-static way and a trigger in a dynamic way, the UE 116 assumes the two sets of configurations in the semi-static way and the dynamic way are consistent.

In one embodiment, a UE can be provided with multiple triggers in the dynamic way.

For one example, when a UE is provided with multiples triggers in the dynamic way, the UE 116 assumes the sets of configurations provided by the multiples triggers in the dynamic way are consistent.

For another example, when a UE is provided with multiples triggers in the dynamic way, the UE 116 performs DL and/or UL positioning according to the trigger that occurs later and closest to the UE 116 (e.g., a later trigger overrides an earlier trigger).

In one embodiment, there could be a time delay applied after the trigger for adaption of positioning and the UE 116 applies the set of configurations based on the trigger after the time delay comparing to the reception of the trigger.

For one example, the value of the time delay can be based on a UE capability.

For another example, the value of the time delay can be fixed in the specification (e.g., as a fixed number of milliseconds, or slots or symbols).

For yet another example, the value of the time delay can be provided by higher layer parameter.

For yet another example, the value of the time delay can be provided by the trigger.

For one example, the UE 116 stops performing at least one of DL PRS measurement, and/or DL PRS measurement report, and/or UL SRS transmission, from the reception of the trigger and for a time duration provided by the delay.

For another example, the UE 116 performs at least one of DL PRS measurement, and/or DL PRS measurement report, and/or UL SRS transmission using the current set of configurations, from the reception of the trigger and for a time duration provided by the delay.

In one embodiment, the components in the set of configurations for positioning adaptation includes parameter related to PRS based measurement.

For one example, the components can include a PRS resource ID (e.g., nr-DL-PRS-ResourceID).

For another example, the components can include a pattern for the comb structure of PRS, e.g., including a comb size and a resource element (RE) offset (e.g., dl-PRS-CombSizeN-AndReOffset).

For yet another example, the components can include a time domain resource mapping for the PRS, e.g., including a periodicity and/or a slot offset (e.g., periodicityAndOffset).

For yet another example, the components can include a time domain resource mapping for the PRS, e.g., including a slot offset (e.g., dl-PRS-ResourceSlotOffset) and/or a symbol offset (e.g., dl-PRS-ResourceSymbolOffset).

For yet another example, the components can include a time domain resource mapping for the PRS in a burst, e.g., including a repetition factor (e.g., repetitionFactor) and/or a time domain gap (e.g., timeGap).

For yet another example, the components can include a time domain resource mapping for the PRS, e.g., including a number of symbols (e.g., numSymbols).

For yet another example, the components can include a frequency domain resource mapping for the PRS, e.g., including a bandwidth of the PRS resource (e.g., dl-PRS-ResourceBandwidth).

For yet another example, the components can include a frequency domain resource mapping for the PRS, e.g., including a starting resource block (RB) of the PRS resource (e.g., dl-PRS-StartPRB).

For yet another example, the components can include a sequence ID for the PRS (e.g., dl-PRS-SequenceID).

For yet another example, the components can include a bandwidth part for the PRS reception/measurement.

For yet another example, the components can include parameters for measurement window for the PRS, e.g., including a window periodicity, a window duration, and/or a window offset.

For yet another example, the components can include the PRS resource ID in the measurement window for the PRS.

In another embodiment, the components in the set of configurations for positioning adaptation includes parameter related to PRS measurement reporting.

For one example, the components can include a time domain information on the resource for the uplink channel to report PRS based measurement report, e.g., including a periodicity of the resource, and/or an offset of the resource when the resource is periodic or semi-persistent, or including an offset in slot or symbol for the resource when the resource is aperiodic.

For another example, the components can include a frequency domain information on the resource for the uplink channel to report PRS based measurement report, e.g., including a BWP information, and/or a starting RB, and/or a bandwidth.

For yet another example, the components can include a type or a format of the uplink channel to report PRS based measurement report, e.g., a physical uplink control channel (PUCCH) format, or a type of physical uplink shared channel (PUSCH).

For yet another example, the components can include a frequency hopping pattern for the uplink channel to report PRS based measurement report.

For yet another example, the components can include a number of repetitions for the uplink channel to report PRS based measurement report.

In yet another embodiment, the components in the set of configurations for positioning adaptation includes parameter related to SRS transmission.

For one example, the components can include an SRS positioning resource ID (e.g., srs-PosResourceId).

For another example, the components can include a pattern for the comb structure of SRS transmission, e.g., including a comb offset and/or a cyclic shift (e.g., transmissionComb).

For yet another example, the components can include a type of SRS resource for positioning, e.g., as one of aperiodic, semi-persistent, or periodic (e.g., resourceType).

For yet another example, the components can include a time domain resource mapping for the SRS within a slot, e.g., including a starting symbol in a slot and/or a number of symbols (e.g., resourceMapping).

For yet another example, the components can include a time domain resource mapping for the slot including SRS, e.g., including a periodicity and/or a slot offset (e.g., slotOffset or periodicityAndOffset).

For yet another example, the components can include a frequency domain resource mapping for the SRS, e.g., including a frequency offset (e.g., freqDomainShift).

For yet another example, the components can include a bandwidth and/or a starting RB of the SRS.

For yet another example, the components can include a bandwidth part for the SRS transmission.

For yet another example, the components can include a sequence ID for the SRS, e.g., sequenceId.

For yet another example, the components can include a frequency domain hopping pattern for the SRS, e.g., no hopping, group hopping, or sequence hopping (e.g., groupOrSequenceHopping).

For yet another example, the components can include a frequency domain hopping parameter for the SRS (e.g., freqHopping).

For yet another example, the components can include spatial relation information for the SRS, e.g., including a serving cell ID, or a reference signal (e.g., SRS-SpatialRelationInfo).

For yet another example, the components can include power control related parameters for the SRS, e.g., including an alpha value or a p0 value for calculating the power (e.g., alpha or p0).

For yet another example, the components can include reference signal for pathloss determination (e.g., pathlossReferenceRS-Pos).

In yet another embodiment, the components in the set of configurations for positioning adaptation includes parameter related to paging.

For one example, the components can include a type of paging DRX cycle, e.g., at least one from a regular paging DRX cycle, and/or an extended paging DRX cycle, and/or a short paging DRX cycle.

For another example, the components can include a type of search space set for monitoring PDCCH for paging, e.g., at least one from a default search space set same as the one for monitoring Type0-PDCCH, or a search space set configured by dedicated signaling.

For yet another example, the components can include a periodicity for the paging resource, e.g., a periodicity for paging frame or paging cycle.

For yet another example, the components can include a time domain configuration for the paging resource, e.g., including an offset to determine the paging frame.

For yet another example, the components can include a configuration for the first PDCCH monitoring occasion for paging (e.g., firstPDCCH-MonaoringOccasionOfPO).

For yet another example, the components can include a value of ns to determine the PDCCH monitoring occasion for paging (e.g., ns).

For yet another example, the components can include a number of PDCCH monitoring occasions for paging per SS/PBCH block (e.g., nrofPDCCH-MonitoringOccasionPerSSB-InPO).

For yet another example, the components can include a configuration for SS/PBCH block transmission to determine the PDCCH monitoring occasion for paging.

In yet another embodiment, the components in the set of configurations for positioning adaptation includes parameter related to PEI, e.g., DCI format 2_7 with CRC scrambled by PEI-RNTI.

For one example, the components can include a periodicity for determining the monitoring occasion for PDCCH carrying PEI.

For another example, the components can include an offset for determining the monitoring occasion for PDCCH carrying PEI.

For yet another example, the components can include a duration for determining the monitoring occasion for PDCCH carrying PEI.

For yet another example, the components can include a frame offset for determining the monitoring occasion for PDCCH carrying PEI (e.g., pei-FrameOffset).

For yet another example, the components can include a configuration for the number of paging occasions per PEI (e.g., po-NumPerPEI).

For yet another example, the components can include a configuration for the subgroups, e.g., including a number of subgroups per paging occasion (e.g., subgroupsNumPerPO).

For yet another example, the components can include a payload size for DCI format 2_7 (e.g., payloadSizeDCI-2-7).

For yet another example, the components can include a configuration for SS/PBCH block transmission to determine the PDCCH monitoring occasion for PEI.

In yet another embodiment, the components in the set of configurations for positioning adaptation includes an indication on which power consumption level is assumed by the UE 116.

For one example, the power consumption level can be one of P1 and P2, wherein P1>P2. P1 is associated with an operation that the UE 116 performs both paging and positioning and P2 is associated with an operation that the UE 116 performs positioning only.

In one embodiment, a UE can provide its feedback when trying to receive the trigger for positioning adaptation.

For one example, when the UE 116 receives the trigger for positioning adaptation, the UE 116 can send the gNB 102 an acknowledgement (ACK) feedback.

For another example, when the UE 116 does not receive the trigger for positioning adaptation, the UE 116 can send the gNB a negative acknowledgement (NACK) feedback.

For yet another example, when the UE 116 does not receive the trigger for positioning adaptation, the UE 116 can send the gNB a DRX feedback (e.g., a feedback other than ACK or NACK feedback).

For yet another example, when the UE 116 does not receive the trigger for positioning adaptation, the UE 116 may not send any feedback.

For one example, the ACK feedback can be a HARQ-ACK transmitted in PUCCH and/or PUSCH resources.

For another example, the NACK feedback can be a hybrid automatic repeat request (HARQ)-NACK transmitted in PUCCH and/or PUSCH resources.

For yet another example, the DRX feedback can be a feedback (e.g., a feedback other than HARQ-ACK or HARQ-NACK) transmitted in PUCCH and/or PUSCH resources.

To improve power efficiency at least in RRC_IDLE, the UE 116 may need to be provided with configuration for DL and/or UL positioning reference signal and try to avoid RRC connection or reconnection to acquire the configuration every time. There could also be relationship between the configuration for DL and/or UL positioning reference signal in RRC_IDLE and RRC CONNECTED. Embodiments of the present disclosure could also be applicable to RRC_I-NACTIVE.

Embodiments of the present disclosure focus on the design of positioning measurement in RRC_IDLE mode. More precisely, the following aspects are included:

Acquiring configuration of DL/UL positioning
        PRS configuration
        PRS measurement report configuration
        SRS configuration
        Positioning SRS configuration
    Metric for DL/UL positioning
    DL/UL positioning RS availability indication
    Example UE procedure In one embodiment, a UE can be provided with a set of configurations for PRS.

In one example, the set of configurations can be provided by system information.

In one sub-example, the system information can be master information block (MIB).

In another sub-example, the system information can be system information block 1 (SIB1) or known as remaining minimum system information (RMSI).

In yet another sub-example, the system information can be system information block other than SIB1, e.g., SIBx wherein x>1, or known as open system interconnection (OSI).

In yet another sub-example, the system information can be system information block for positioning purpose, e.g., SIBpos.

In another example, the set of configurations can be provided by paging related message and/or channels.

In one sub-example, the paging related message and/or channels can be a DCI format carried by PDCCH monitored in CSS with RNTI scrambled by P-RNTI, e.g., paging DCI format.

In another sub-example, the paging related message and/or channels can be a paging short message carried by PDCCH monitored in CSS with RNTI scrambled by P-RNTI.

In yet another sub-example, the paging related message and/or channels can be carried by a PDSCH scheduled by a PDCCH monitored in CSS with RNTI scrambled by P-RNTI, e.g., paging PDSCH.

In yet another sub-example, the paging related message and/or channels can be a DCI format carried by PDCCH in CSS with RNTI scrambled by PEI-RNTI, e.g., PEI DCI format.

In yet another example, the set of configurations can be provided by RACH related message and/or channels.

In one sub-example, the random access channel (RACH) related message and/or channels can be Msg2 in a 4-step RACH procedure (e.g., RAR).

In another sub-example, the RACH related message and/or channels can be Msg4 in a 4-step RACH procedure.

In yet another sub-example, the RACH related message and/or channels can be MsgB in a 2-step RACH procedure.

In yet another example, the set of configurations can be provided by RRC release message.

In one example, the embodiment is at least applicable for RRC_IDLE mode.

In another example, the embodiment is at least applicable for RRC_INACTIVE mode.

In one example, the set of configurations includes at least one of the following components:

In a first component, a PRS ID.
    In a second component, a PRS resource set ID.
    In a third component, a PRS resource ID.
    In a fourth component, a periodicity of PRS resource set.
    In a fifth component, an offset for PRS resource set (e.g., jointly coded with the periodicity).
    In a sixth component, a number of RB for PRS resource set.
    In a seventh component, a starting RB for PRS resource set.
    In an eighth component, a number of symbols for PRS resource set.
    In a ninth component, a repetition factor for PRS resource set.
    In a tenth component, a time gap for PRS in repetition for PRS resource set.
    In an eleventh component, a comb size for PRS resource.
    In a twelfth component, a sequence ID for PRS resource.
    In a thirteenth component, a time domain offset for PRS resource (e.g., potentially including a slot level offset and/or a symbol level offset).
    In a fourteenth component, a frequency domain offset for PRS resource (e.g., jointly coded with the comb size).
    In a fifteenth component, QCL info for PRS resource.
    In a sixteenth component, a parameter for a measurement window to perform PRS based measurement, wherein the parameter can be at least one of a periodicity (or a repetition period), an offset, or a duration.
    In a seventeenth component, a reference frequency location (e.g., point A location) for performing PRS based measurement.

In yet another embodiment, a UE can be provided with a set of configurations for PRS measurement reporting.

In one example, the set of configurations can be provided by system information.

In one sub-example, the system information can be master information block (MIB).

In another sub-example, the system information can be system information block 1 (SIB1) or known as RMSI.

In yet another sub-example, the system information can be system information block other than SIB1, e.g., SIBx wherein x>1, or known as OSI.

In yet another sub-example, the system information can be system information block for positioning purpose, e.g., SIBpos.

In another example, the set of configurations can be provided by paging related message and/or channels.

In one sub-example, the paging related message and/or channels can be a DCI format carried by PDCCH monitored in CSS with RNTI scrambled by P-RNTI, e.g., paging DCI format.

In another sub-example, the paging related message and/or channels can be a paging short message carried by PDCCH monitored in CSS with RNTI scrambled by P-RNTI.

In yet another sub-example, the paging related message and/or channels can be carried by a PDSCH scheduled by a PDCCH monitored in CSS with RNTI scrambled by P-RNTI, e.g., paging PDSCH.

In yet another sub-example, the paging related message and/or channels can be a DCI format carried by PDCCH in CSS with RNTI scrambled by PEI-RNTI, e.g., PEI DCI format.

In yet another example, the set of configurations can be provided by RACH related message and/or channels.

In one sub-example, the RACH related message and/or channels can be Msg2 in a 4-step RACH procedure (e.g., RAR).

In another sub-example, the RACH related message and/or channels can be Msg4 in a 4-step RACH procedure.

In yet another sub-example, the RACH related message and/or channels can be MsgB in a 2-step RACH procedure.

In yet another example, the set of configurations can be provided by RRC release message.

In one example, the embodiment is at least applicable for RRC_IDLE mode.

In another example, the embodiment is at least applicable for RRC_INACTIVE mode.

In one example, the PRS based measurement report can be included in Msg1 of 4-step PRACH procedure (e.g., a PRACH format).

In another example, the PRS based measurement report can be included in Msg3 of 4-step PRACH procedure.

In yet another example, the PRS based measurement report can be included in MsgA of 2-step PRACH procedure.

In yet another example, the PRS based measurement report can be included in a PUCCH (e.g., a UCI format).

In yet another example, the PRS based measurement report can be included in a PUSCH (e.g., a UCI format). For instance, a CG-PUSCH.

In one example, the set of configurations includes at least one of the following components:

In a first component, a repetition period of a measurement window (e.g., PRS processing window, short for PPW).

In a second component, an offset of a measurement window (e.g., PRS processing window, short for PPW).

In a third component, a duration for measurement (e.g., a length for measurement).

In a fourth component, a repetition factor for measurement.

In a fifth component, a reference frequency location (e.g., PRS point A) for measurement.

In yet another embodiment, a UE can be provided with a set of configurations for SRS.

In one example, the set of configurations can be provided by system information.

In one sub-example, the system information can be master information block (MIB).

In another sub-example, the system information can be system information block 1 (SIB1) or known as RMSI.

In yet another sub-example, the system information can be system information block other than SIB1, e.g., SIBx wherein x>1, or known as OSI.

In yet another sub-example, the system information can be system information block for positioning purpose, e.g., SIBpos.

In another example, the set of configurations can be provided by paging related message and/or channels.

In one sub-example, the paging related message and/or channels can be a DCI format carried by PDCCH monitored in CSS with RNTI scrambled by P-RNTI, e.g., paging DCI format.

In another sub-example, the paging related message and/or channels can be a paging short message carried by PDCCH monitored in CSS with RNTI scrambled by P-RNTI.

In yet another sub-example, the paging related message and/or channels can be carried by a PDSCH scheduled by a PDCCH monitored in CSS with RNTI scrambled by P-RNTI, e.g., paging PDSCH.

In yet another sub-example, the paging related message and/or channels can be a DCI format carried by PDCCH in CSS with RNTI scrambled by PEI-RNTI, e.g., PEI DCI format.

In yet another example, the set of configurations can be provided by RACH related message and/or channels.

In one sub-example, the RACH related message and/or channels can be Msg2 in a 4-step RACH procedure (e.g., RAR).

In another sub-example, the RACH related message and/or channels can be Msg4 in a 4-step RACH procedure.

In yet another sub-example, the RACH related message and/or channels can be MsgB in a 2-step RACH procedure.

In yet another example, the set of configurations can be provided by RRC release message.

In one example, the embodiment is at least applicable for RRC_IDLE mode.

In another example, the embodiment is at least applicable for RRC_INACTIVE mode.

In one example, the set of configurations includes at least one of the following components:

In a first component, a SRS resource set ID.

In a second component, a list of SRS resources.

In a third component, a SRS resource type.

In a fourth component, a usage of the SRS resource.

In a fifth component, an alpha value for the SRS resource.

In a sixth component, a p0 value for the SRS resource.

In a seventh component, a RS for pathloss reference.

In an eighth component, a power control adjustment state for SRS.

In a ninth component, a list of available slot offset.

In a tenth component, an indication on whether to follow unified transmission configuration indication (TCI) state for SRS.

In yet another embodiment, a UE can be provided with a set of configurations for positioning SRS.

In one example, the set of configurations can be provided by system information.

In one sub-example, the system information can be master information block (MIB).

In another sub-example, the system information can be system information block 1 (SIB1) or known as RMSI.

In yet another sub-example, the system information can be system information block other than SIB1, e.g., SIBx wherein x>1, or known as OSI.

In yet another sub-example, the system information can be system information block for positioning purpose, e.g., SIBpos.

In another example, the set of configurations can be provided by paging related message and/or channels.

In one sub-example, the paging related message and/or channels can be a DCI format carried by PDCCH monitored in CSS with RNTI scrambled by P-RNTI, e.g., paging DCI format.

In another sub-example, the paging related message and/or channels can be a paging short message carried by PDCCH monitored in CSS with RNTI scrambled by P-RNTI.

In yet another sub-example, the paging related message and/or channels can be carried by a PDSCH scheduled by a PDCCH monitored in CSS with RNTI scrambled by P-RNTI, e.g., paging PDSCH.

In yet another sub-example, the paging related message and/or channels can be a DCI format carried by PDCCH in CSS with RNTI scrambled by PEI-RNTI, e.g., PEI DCI format.

In yet another example, the set of configurations can be provided by RACH related message and/or channels.

In one sub-example, the RACH related message and/or channels can be Msg2 in a 4-step RACH procedure (e.g., RAR).

In another sub-example, the RACH related message and/or channels can be Msg4 in a 4-step RACH procedure.

In yet another sub-example, the RACH related message and/or channels can be MsgB in a 2-step RACH procedure.

In yet another example, the set of configurations can be provided by RRC release message.

In one example, the embodiment is at least applicable for RRC_IDLE mode.

In another example, the embodiment is at least applicable for RRC_INACTIVE mode.

In one example, the set of configurations includes at least one of the following components:

In a first component, a positioning SRS resource set ID.

In a second component, a list of positioning SRS resource ID.

In a third component, a positioning SRS resource type.

In a fourth component, an alpha value for the positioning SRS resource.

In a fifth component, a p0 value for the positioning SRS resource.

In a sixth component, a RS for pathloss reference.

In a seventh component, a power control adjustment state for positioning SRS.

In an eighth component, a list of available slot offset.

In a ninth component, an indication on whether to follow unified TCI state.

In an eleventh component, a comb structure for positioning SRS transmission.

In a twelfth component, a starting symbol for positioning SRS mapping.

In a thirteenth component, a number of symbols for positioning SRS mapping.

In a fourteenth component, a frequency domain shift for positioning SRS.

In a fifteenth component, a frequency domain hopping for positioning SRS.

In a sixteenth component, an indication on whether group hopping and/or sequence hopping is enabled for positioning SRS.

In a seventeenth component, a sequence ID for positioning SRS.

In an eighteenth component, spatial relationship information for positioning SRS.

In one embodiment, the measurement metric for DL and/or UL positioning can be enhanced.

For one example, DL PRS reference signal received power (e.g., DL PRS-RSRP) can be applicable for RRC_IDLE.

For another example, DL PRS reference signal received path power (e.g., DL PRS-RSRPP) can be applicable for RRC_IDLE.

For yet another example, DL reference signal time difference (e.g., DL RSTD) can be applicable for RRC_IDLE.

For yet another example, UE Rx-Tx time difference can be applicable for RRC_IDLE.

For yet another example, SRS reference signal received power (e.g., SRS-RSRP) can be applicable for at least one of RRC_IDLE or RRC_INACTIVE.

For yet another example, SS reference signal antenna relative phase (e.g., SS-RSRP) can be applicable for at least one of RRC_IDLE or RRC_INACTIVE.

In one embodiment, there can be a dynamic indication on the availability of reference signal for positioning.

For one example, the dynamic indication can be included in a DCI format carried by PDCCH monitored in CSS with RNTI scrambled by P-RNTI, e.g., paging DCI format. The configuration for the CSS can be provided by higher layer parameters.

For another example, the dynamic indication can be included in a DCI format carried by PDCCH in CSS with RNTI scrambled by PEI-RNTI, e.g., PEI DCI format. The configuration for the CSS can be provided by higher layer parameters.

For yet another example, the dynamic indication can be included in a paging short message carried by PDCCH monitored in CSS with RNTI scrambled by P-RNTI. The configuration for the CSS can be provided by higher layer parameters.

For yet another example, the dynamic indication can be included in a PDSCH scheduled by a PDCCH monitored in CSS with RNTI scrambled by P-RNTI, e.g., paging PDSCH. The configuration for the CSS can be provided by higher layer parameters.

For one example, the availability of reference signal for positioning can be the availability of PRS.

For another example, the availability of reference signal for positioning can be the availability of positioning SRS.

For yet another example, the availability of reference signal for positioning can be the availability for PRS based measurement reporting.

For one example, the indication can be according to a bitmap.

For one sub-example, each bit in the bitmap corresponds to a reference signal resource or resource set. The bit taking a value of 1 refers to the corresponding reference signal resource or resource set being available, and the bit taking a value of 0 refers to the corresponding reference signal resource or resource set being not available.

For another sub-example, each bit in the bitmap corresponds to a reference signal resource or resource set. The bit taking value of 1 refers to the corresponding reference signal resource or resource set being available, and the bit taking value of 0 refers to the availability of the corresponding reference signal resource or resource set maintains the same.

For one further contemplation for the sub-examples herein, there could be a time duration (e.g., N) applied to the indicated availability (e.g., taking value of 1 in the bitmap), wherein the unit of the time duration can be one of a symbol, a slot, a frame, or a DRX cycle. For one instance, the time duration can be provided by higher layer parameters. For another instance, the time duration can be provided together with the bitmap in the same channel (e.g., same DCI format).

Figure 15:
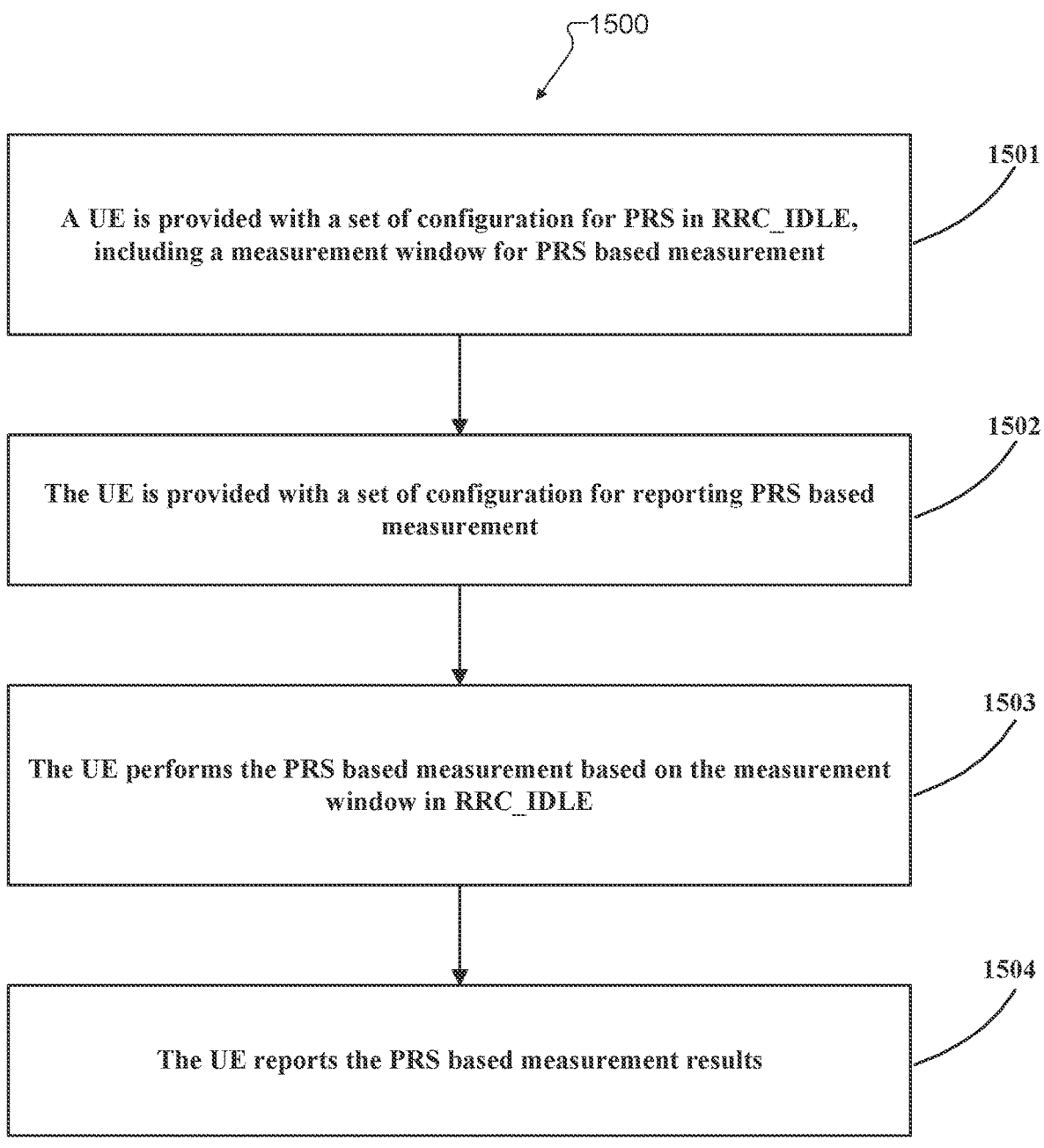
FIG. 15 illustrates a flowchart of an example UE procedure for positioning reference signal (PRS) based measurement according to embodiments of the present disclosure.

FIG. 15 illustrates a flowchart of an example UE procedure 1500 for PRS based measurement according to embodiments of the present disclosure. For example, procedure 1500 can be performed by any of the UEs 111-116 of FIG. 1 and, more particularly, transceiver(s) 310 of FIG. 3 for PRS based measurement in RRC_IDLE. This example is for illustration only and other embodiments can be used without departing from the scope of the disclosure.

The procedure begins in step 1501, a UE is provided with a set of configuration for PRS in RRC_IDLE, including a measurement window for PRS based measurement. In step 1502, the UE 116 is then provided with a set of configuration for reporting PRS based measurement. In step 1503, the UE 116 then performs the PRS based measurement based on the measurement window RRC_IDLE. In step 1504, the UE 116 then reports the PRS based measurement results.

Figure 16:
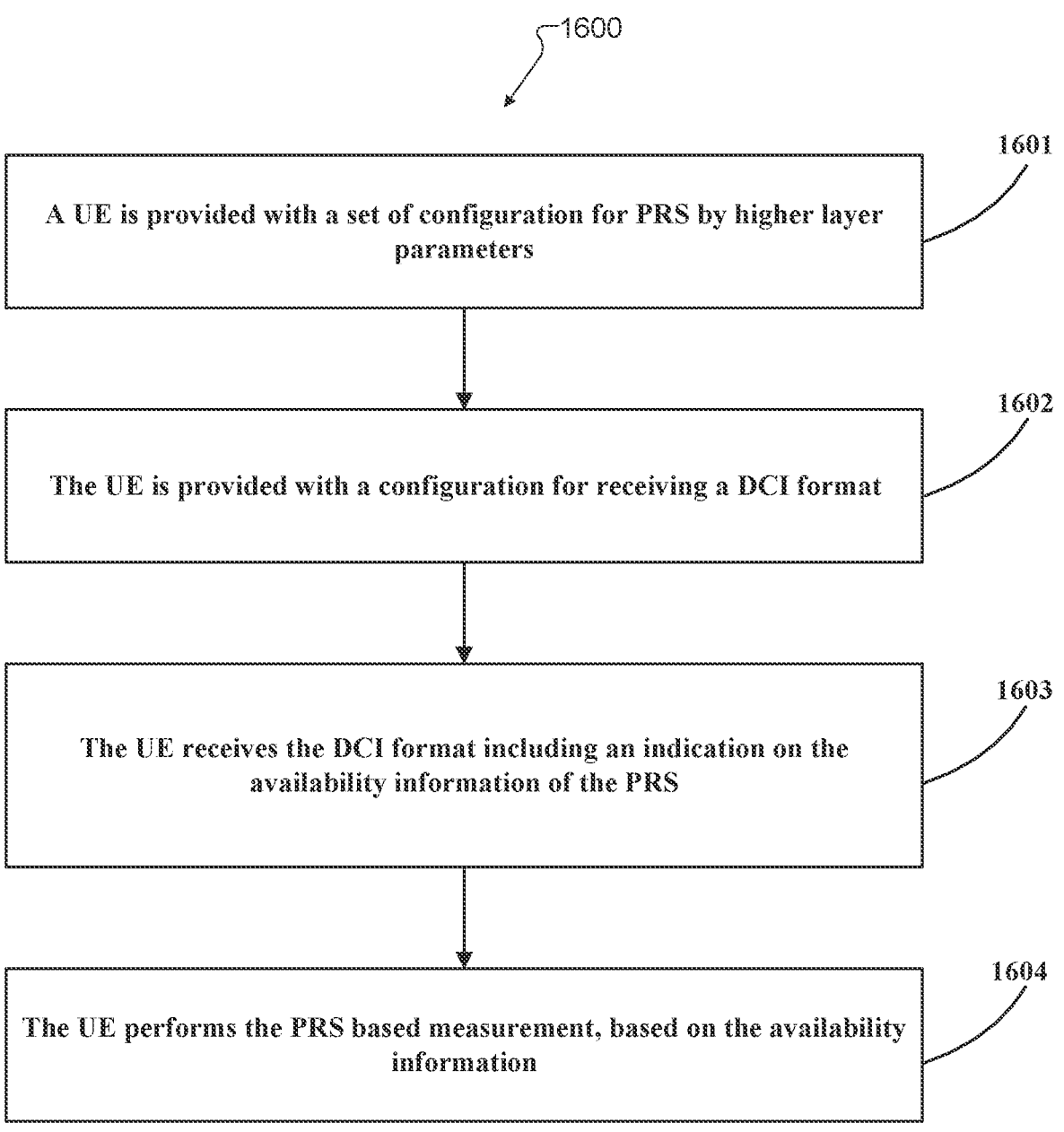
FIG. 16 illustrates a flowchart of an example UE procedure for availability indication of PRS according to embodiments of the present disclosure.

FIG. 16 illustrates a flowchart of an example UE procedure 1600 for availability indication of PRS according to embodiments of the present disclosure. For example, procedure 1600 can be performed by UE 116 of FIG. 3 and, more particularly, by the processor 340. This example is for illustration only and other embodiments can be used without departing from the scope of the disclosure.

The procedure beings in step 1601, a UE is provided with a set of configuration for PRS by higher later parameters. In step 1602, the UE 116 is then provided with a configuration for receiving a DCI format. In step 1603, the UE 116 then received the DCI format including an indication on the availability information of the PRS. In step 1604, the UE 116 performs the PRS based measurement based on the availability information.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Any of the above variation embodiments can be utilized independently or in combination with at least one other variation embodiment.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A base station (BS) in a wireless communication system, the BS comprising:
   a processor configured to:
      determine a first set of configurations for positioning; and
      determine a second set of configurations for positioning, wherein the first and second sets of configurations include configurations for a downlink (DL) positioning reference signal (PRS) based positioning measurement or an uplink (UL) sounding reference signal (SRS) transmission; and
   a transceiver operably coupled to the processor, the transceiver configured to transmit a downlink control information (DCI) format including an indication on which of the first or second sets of configurations to use for positioning,
   wherein the indicated first or second set of configurations to use for positioning is used after the transmission of the DCI format with a time domain delay, and
   wherein the time domain delay is based on a user equipment (UE) capability.

2. The BS of claim 1, wherein the second set of configurations do not include a resource for the DL PRS based positioning measurement or for the UL SRS transmission.

3. The BS of claim 1, wherein the DL PRS based positioning measurement is based on one of a DL PRS reference signal received power (DL PRS-RSRP), a DL PRS reference signal received path power (DL PRS-RSRPP), and a DL reference signal time difference (DL RSTD).

4. The BS of claim 1, wherein:
   the transceiver is further configured to transmit a paging related channel,
   the paging related channel includes an indication on whether to perform the DL PRS based positioning measurement or the UL SRS transmission in a next paging cycle; and
   the paging related channel is one of a physical downlink control channel (PDCCH) including a DCI format for paging, a PDCCH including a paging short message, and a physical downlink shared channel (PDSCH) scheduled by the DCI format for paging.

5. The BS of claim 1, wherein:
   the transceiver is further configured to transmit a second DCI format for a paging early indication (PEI), and
   the second DCI format for the PEI includes an indication of whether to perform the DL PRS based positioning measurement or the UL SRS transmission in a next paging cycle.

6. A user equipment (UE) in a wireless communication system, the UE comprising:
   a processor configured to:
      determine a first set of configurations for positioning; and
      determine a second set of configurations for positioning, wherein the first and second sets of configurations include configurations for a downlink (DL) positioning reference signal (PRS) based positioning measurement or an uplink (UL) sounding reference signal (SRS) transmission; and
   a transceiver operably coupled to the processor, the transceiver configured to receive a downlink control information (DCI) format including an indication on which of the first or second sets of configurations to use for positioning,
   wherein the indicated first or second set of configurations to use for positioning is used after the transmission of the DCI format with a time domain delay, and
   wherein the time domain delay is based on a capability of the UE.

7. The UE of claim 6, wherein the second set of configurations do not include a resource for the DL PRS based positioning measurement or for the UL SRS transmission.

8. The UE of claim 6, wherein the UE is in RRC_IDLE state or RRC_INACTIVE state prior to reception of the DCI format.

9. The UE of claim 6, wherein the DL PRS based positioning measurement is based on one of a DL PRS reference signal received power (DL PRS-RSRP), a DL PRS reference signal received path power (DL PRS-RSRPP), and a DL reference signal time difference (DL RSTD).

10. The UE of claim 6, wherein:

the transceiver is further configured to receive a paging related channel, the paging related channel includes an indication on whether to perform the DL PRS based positioning measurement or the UL SRS transmission in a next paging cycle; and the paging related channel is one of a physical downlink control channel (PDCCH) including a DCI format for paging, a PDCCH including a paging short message, and a physical downlink shared channel (PDSCH) scheduled by the DCI format for paging.

11. The UE of claim 6, wherein:

the transceiver is further configured to receive a second DCI format for a paging early indication (PEI), and the second DCI format for the PEI includes an indication of whether to perform the DL PRS based positioning measurement or the UL SRS transmission in a next paging cycle.

12. A method of a user equipment (UE) in a wireless communication system, the method comprising:

determining a first set of configurations for positioning;

determining a second set of configurations for positioning, wherein the first and second sets of configurations include configurations for a downlink (DL) positioning reference signal (PRS) based positioning measurement or an uplink (UL) sounding reference signal (SRS) transmission; and receiving a downlink control information (DCI) format including an indication on which of the first or second sets of configurations to use for positioning, wherein the indicated first or second set of configurations to use for positioning is used after the transmission of the DCI format with a time domain delay, and wherein the time domain delay is based on a capability of the UE.

13. The method of claim 12, wherein the second set of configurations do not include a resource for the DL PRS based positioning measurement or for the UL SRS transmission.

14. The method of claim 12, wherein the UE is in RRC_IDLE state or RRC_INACTIVE state prior to reception of the DCI format.

15. The method of claim 12, wherein the PRS based positioning measurement is based on one of a DL PRS reference signal received power (DL PRS-RSRP), a DL PRS reference signal received path power (DL PRS-RSRPP), and a DL reference signal time difference (DL RSTD).

16. The method of claim 12, further comprising:

receiving a paging related channel, wherein:

the paging related channel includes an indication on whether to perform the DL PRS based positioning measurement or the UL SRS transmission in a next paging cycle; and the paging related channel is one of a physical downlink control channel (PDCCH) including a DCI format for paging, a PDCCH including a paging short message, and a physical downlink shared channel (PDSCH) scheduled by the DCI format for paging.

17. The method of claim 12, further comprising receiving a DCI format for a paging early indication (PEI), wherein the DCI format for the PEI includes an indication of whether to perform the DL PRS based positioning measurement or the UL SRS transmission in a next paging cycle.

* * * * *